(12) United States Patent
Ueda et al.

(10) Patent No.: US 8,933,692 B2
(45) Date of Patent: Jan. 13, 2015

(54) ROTATION ANGLE DETECTION DEVICE

(75) Inventors: Takeshi Ueda, Kashiba (JP); Yoshinobu Shimizu, Sakai (JP)

(73) Assignee: Jtekt Corporation, Osaka (JP)

( * ) Notice: Subject to any disclaimer, the term of this patent is extended or adjusted under 35 U.S.C. 154(b) by 285 days.

(21) Appl. No.: 13/389,985

(22) PCT Filed: Aug. 20, 2010

(86) PCT No.: PCT/JP2010/064102
§ 371 (c)(1),
(2), (4) Date: Feb. 10, 2012

(87) PCT Pub. No.: WO2011/024730
PCT Pub. Date: Mar. 3, 2011

(65) Prior Publication Data
US 2012/0139532 A1 Jun. 7, 2012

(30) Foreign Application Priority Data

Aug. 26, 2009 (JP) .................................. 2009-195188
Apr. 15, 2010 (JP) .................................. 2010-094061

(51) Int. Cl.
G01B 7/30 (2006.01)
G01B 7/14 (2006.01)
G01D 5/244 (2006.01)

(52) U.S. Cl.
CPC ..................................... G01D 5/2448 (2013.01)
USPC ................................. 324/207.25; 324/207.22

(58) Field of Classification Search
None
See application file for complete search history.

(56) References Cited

U.S. PATENT DOCUMENTS

| | | | |
|---|---|---|---|
| 5,880,586 A | 3/1999 | Dukart et al. | |
| 2002/0124663 A1* | 9/2002 | Tokumoto et al. | ....... 73/862.333 |
| 2008/0074102 A1 | 3/2008 | Kitanaka et al. | |
| 2009/0085508 A1 | 4/2009 | Nagai et al. | |
| 2009/0202185 A1* | 8/2009 | Koike et al. | ................... 384/448 |

FOREIGN PATENT DOCUMENTS

| | | |
|---|---|---|
| CN | 101399513 A | 4/2009 |
| JP | 06341856 A * | 12/1994 |
| JP | A-06-341856 | 12/1994 |
| JP | A-09-508214 | 8/1997 |
| JP | A-2001-264114 | 9/2001 |
| JP | A-2002-228488 | 8/2002 |

(Continued)

OTHER PUBLICATIONS

Mar. 13, 2012 International Preliminary Report on Patentability issued in International Patent Application No. PCT/JP2010/064102 (with translation).

(Continued)

*Primary Examiner* — Melissa Koval
*Assistant Examiner* — Courtney McDonnough
(74) *Attorney, Agent, or Firm* — Oliff PLC

(57) ABSTRACT

An output signal $V1=\sin\theta$ is output from a first magnetic sensor and an output signal $V2=\cos(\theta+\alpha)$ is output from a second magnetic sensor. An output signal correction unit in a rotation angle computing device corrects the output signal $V2$ from the second magnetic sensor to an output signal $V2'$ ($=\cos\theta$) so that a positional phase difference ($90°+\alpha$) between the magnetic sensors and is made equal to a target phase difference of 90°. A rotation angle computing unit computes the rotation angle $\theta$ of a rotor based on the corrected signal $V2'$ ($=\cos\theta$) and the other output signal $V1$ ($=\sin\theta$).

8 Claims, 14 Drawing Sheets

(56) References Cited

FOREIGN PATENT DOCUMENTS

| JP | A-2002-257649 | 9/2002 |
|----|---------------|--------|
| JP | A-2003-083823 | 3/2003 |
| JP | A-2008-082739 | 4/2008 |
| JP | A-2009-150795 | 7/2009 |

OTHER PUBLICATIONS

International Search Report in International Application No. PCT/JP2010/064102; dated Nov. 22, 2010 (with English-language translation).

* cited by examiner

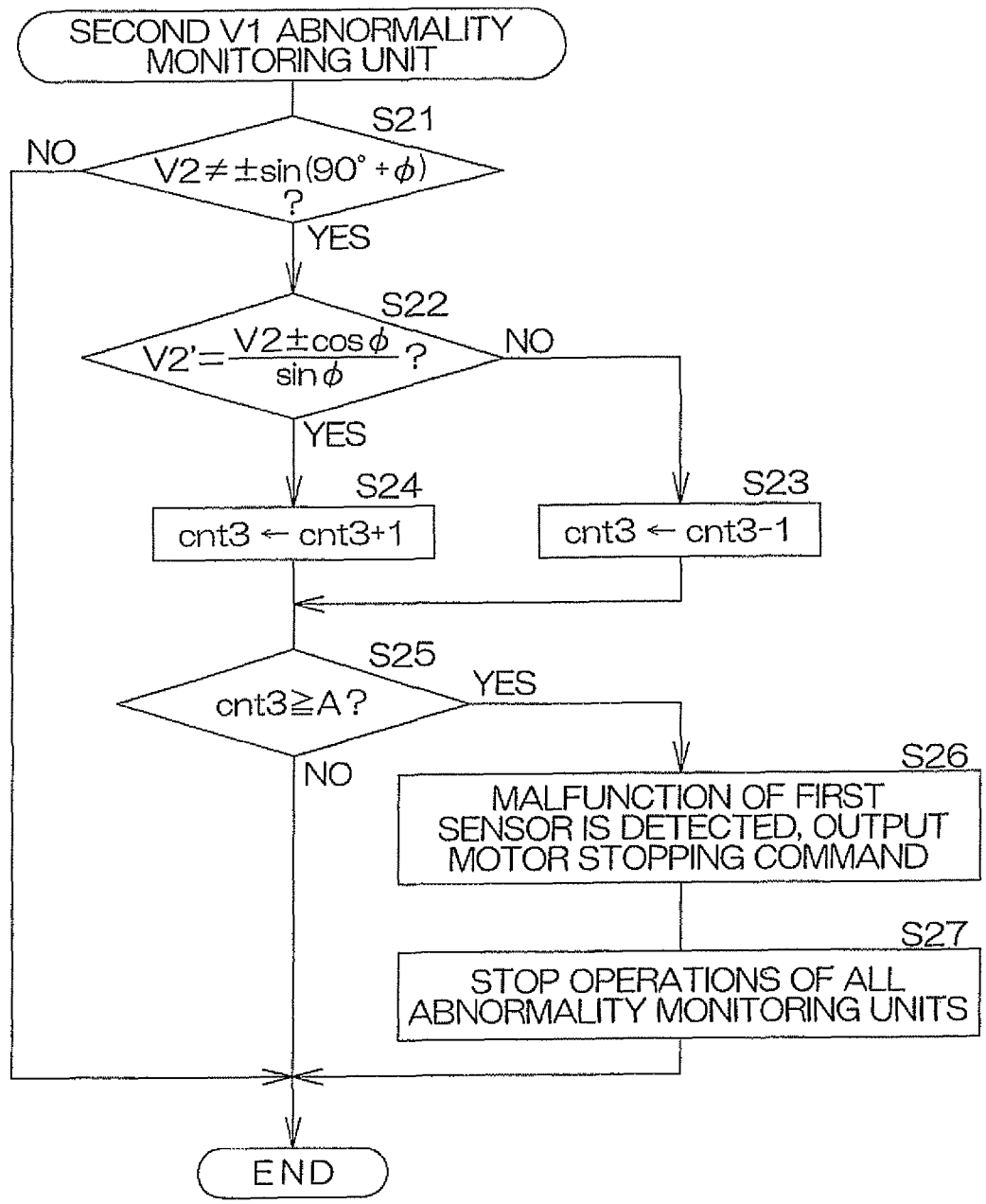

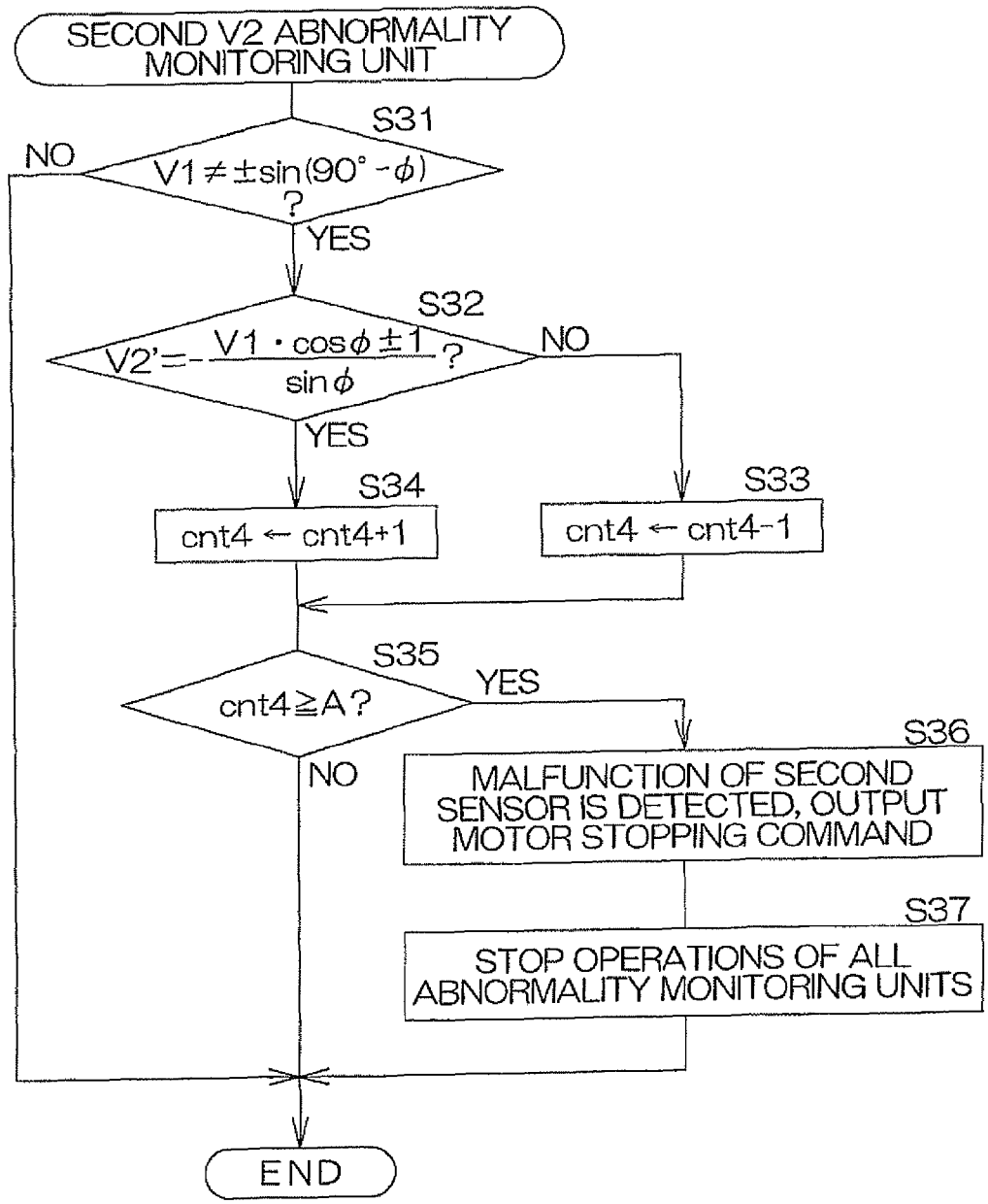

ROTATION ANGLE DETECTION DEVICE

TECHNICAL FIELD

The present invention relates to a rotation angle detection device that detects a rotation angle of a rotating body.

BACKGROUND ART

A brushless motor used in an electric power steering apparatus, etc., is controlled by supplying an electric current to a stator coil in accordance with a rotation angle of a rotor. There is thus known a rotation angle detection device such as that shown in FIG. 13 (see, for example, Patent Document 1). The rotation angle detection device has a rotor 1, which includes a magnet having two magnetic poles, and two magnetic sensors 11 and 12 disposed at an angular interval of 90° centered about a central rotation axis of the rotor 1. The respective magnetic sensors 11 and 12 output sinusoidal signals with a 90° phase difference with respect to each other and the rotation angle of the rotor 1 is detected based on the two sinusoidal signals. Both magnetic sensors 11 and 12 are mounted on a board 2 indicated by dashed lines in FIG. 13.

The direction indicated by the arrow in FIG. 13 shall be deemed to be a positive rotation direction of the rotor 1. It shall also be deemed that the rotation angle of the rotor 1 increases when the rotor 1 is rotated in the positive direction, and the rotation angle of the rotor 1 decreases when the rotor 1 is rotated in the opposite direction. If $\theta$ is the rotation angle of the rotor 1, an output signal V1 of one magnetic sensor 11 is expressed as $V1 = A1 \cdot \sin \theta$, and an output signal V2 of the other magnetic sensor 12 is expressed as $V2 = A2 \cdot \sin(\theta + \pi/2) = A2 \cdot \cos \theta$. A1 and A2 respectively express amplitudes.

If the amplitudes A1 and A2 are deemed to be mutually equal to a value A or both signals V1 and V2 are normalized so that both amplitudes are of a certain predefined value A, one output signal V1 is expressed as $V1 = A \cdot \sin \theta$ and the other output signal V2 is expressed as $V2 = A \cdot \cos \theta$. Further, if A=1, the one output signal V1 is expressed as $V1 = \sin \theta$ and the other output signal V2 is expressed as $V2 = \cos \theta$. Here, to simplify the description, the output signals V1 and V2 of the respective magnetic sensors 11 and 12 shall be expressed as $V1 = \sin \theta$ and $V2 = \cos \theta$.

The rotation angle $\theta$ of the rotor can be determined using both output signals V1 and V2 based, for example, on the following formula (1).

$$\begin{aligned}\theta &= \tan^{-1}(\sin\theta/\cos\theta)\\ &= \tan^{-1}(V1/V2)\end{aligned} \quad (1)$$

CITATION LIST

Patent Literature

Patent Document 1: Japanese Translation of International Application (Kohyo) No. Hei 9-508214

SUMMARY OF INVENTION

Technical Problem

In the conventional rotation angle detection device described above, if the two magnetic sensors 11 and 12 can be disposed accurately at the angular interval of 90° centered about the central rotation axis of the rotor 1, sinusoidal signals with a mutual phase difference of 90° can be output from respective magnetic sensors 11 and 12 as shown in FIG. 14A. In this case, an angular error does not arise in the rotor rotation angle detected by the rotation angle detection device as shown in FIG. 14B.

However, if the angular interval between the two magnetic sensors 11 and 12 deviates from 90° due to variation of mounting of the respective magnetic sensors 11 and 12 on the board 2, assembly variation of the board 2, etc., the phase difference between the output signals of the two magnetic sensors 11 and 12 also deviates from 90° as shown in FIG. 15A, and an angular error arises in the rotor rotation angle detected by the rotation angle detection device as shown in FIG. 15B.

Thus, an object of the present invention is to provide a rotation angle detection device capable of detecting a rotation angle accurately even when a phase difference deviation, due to a relative positional variation of two sensors, is present in output signals of the two sensors.

Another object of the present invention is to provide a rotation angle detection device with which relative positions of two sensors can be set arbitrarily.

Yet another object of the present invention is to provide a rotation angle detection device, which, when one of two sensors malfunctions, can detect the malfunction.

Solution to Problem

A rotation angle detection device according to the present invention is a rotation angle detection device that detects a rotation angle of a rotating body and includes a first sensor disposed at a first position at a periphery of the rotating body and outputting a first sinusoidal signal in accordance with a rotation of the rotating body, a second sensor disposed at a second position at the periphery of the rotating body and at an angular interval from the first position and outputting a second sinusoidal signal, having a positional phase difference corresponding to the angular interval from the first sinusoidal signal, in accordance with the rotation of the rotating body, and a rotation angle computing device computing the rotation angle based on the first sinusoidal signal and the second sinusoidal signal, and the rotation angle computing device includes a signal correction unit correcting one sinusoidal signal of the first sinusoidal signal and the second sinusoidal signal so that the positional phase difference that is a phase difference between the signals is made equal to a target phase difference, and a rotation angle computing unit computing the rotation angle based on the one sinusoidal signal corrected by the signal correction unit and the other sinusoidal signal.

With this arrangement, one sinusoidal signal of the first sinusoidal signal and the second sinusoidal signal is corrected so that the positional phase difference that is the phase difference between the signals is made equal to the target phase difference. The rotation angle is computed based on the one sinusoidal signal that has been corrected and the other sinusoidal signal. Thus, regardless of the positional phase difference between the two sinusoidal signals, one sinusoidal signal among the signals can be corrected so that the phase difference between the signals is made equal to the target phase difference. The target phase difference may be set, for example, to a phase difference suited for computing the rotation angle of the rotating body and the rotation angle can thus be detected accurately.

In a preferred embodiment of the present invention, a difference between the positional phase difference and the target phase difference is a phase difference deviation between the two sinusoidal signals that arises due to a relative positional variation between the first sensor and the second sensor. The rotation angle computing device further includes a phase difference deviation computing unit that computes the phase difference deviation and the signal correction unit corrects the one sinusoidal signal based on the phase difference deviation.

With this arrangement, the phase difference deviation between the two sinusoidal signals is computed. Based on the computed phase difference deviation, the one sinusoidal signal of the first sinusoidal signal and the second sinusoidal signal is corrected so that the positional phase difference that is the phase difference between the signals is made equal to the target phase difference. The rotation angle is computed based on the one sinusoidal signal that has been corrected and the other sinusoidal signal. The rotation angle can thus be detected accurately even in the case where the phase difference deviation due to the relative positional variation between the two sensors is present between the sinusoidal signals output from the two sensors.

In a preferred embodiment of the present invention, the phase difference deviation computing unit includes a first amplitude computing unit computing an amplitude of a signal corresponding to a sum of the first sinusoidal signal and the second sinusoidal signal, a second amplitude computing unit computing an amplitude of a signal corresponding to a difference between the first sinusoidal signal and the second sinusoidal signal, and a deviation computing unit computing the phase difference deviation based on a difference between the amplitude computed by the first amplitude computing unit and the amplitude computed by the second amplitude computing unit.

In a preferred embodiment of the present invention, the target phase difference differs from the positional phase difference. With this arrangement, regardless of the positional phase difference between the two sinusoidal signals, the one sinusoidal signal among the signals can be corrected so that the phase difference between the signals is made equal to the target phase difference that differs from the positional phase difference. The target phase difference may, for example, be set to a phase difference (for example, 90°) suited for computing the rotation angle of the rotating body, and the rotation angle of the rotating body can thus be computed regardless of the positional phase difference between the two sinusoidal signals. The relative positions of the two sensors can thus be set arbitrarily.

In a preferred embodiment of the present invention, a phase difference deviation between the two sinusoidal signals that arises due to a relative positional variation between the first sensor and the second sensor is superimposed on the positional phase difference. The rotation angle computing device further includes a phase difference deviation computing unit that computes the phase difference deviation, and the signal correction unit corrects the one sinusoidal signal based on the positional phase difference and the phase difference deviation.

With this arrangement, even in a case where the phase difference deviation between the two sinusoidal signals that arises due to the relative positional variation between the first sensor and the second sensor is superimposed, the one sinusoidal signal among the signals can be corrected so that the phase difference between the signals is made equal to the target phase difference that differs from, the positional phase difference.

In a preferred embodiment of the present invention, the phase difference deviation computing unit includes a first amplitude computing unit computing an amplitude of a signal corresponding to a sum of the first sinusoidal signal and the second sinusoidal signal, a second amplitude computing unit computing an amplitude of a signal corresponding to a difference between the first sinusoidal signal and the second sinusoidal signal, and a deviation computing unit computing the phase difference deviation based on a difference between the amplitude computed by the first amplitude computing unit and the amplitude computed by the second amplitude computing unit.

In a preferred embodiment of the present invention, the positional phase difference is less than the target phase difference. By this arrangement, the board for mounting the two sensors can be made small. For example, in a case where the target phase difference is 90°, the positional phase difference may be set to less than 90°. In this case, the angular interval between the two sensors can be set to an angular interval less than 90° and thus the board for mounting the two sensors can be made smaller in comparison to the case where the angular interval between the two sensors is 90°.

In a preferred embodiment of the present invention, the rotation angle computing device further includes a first signal abnormality judging unit judging whether or not the first sinusoidal signal is abnormal based on the one sinusoidal signal corrected by the signal correcting unit and the second sinusoidal signal, and a second signal abnormality judging unit judging whether or not the second sinusoidal signal is abnormal based on the one sinusoidal signal corrected by the signal correcting unit and the first sinusoidal signal.

With this arrangement, in a case where a malfunction occurs in the first sensor, the malfunction of the first sensor can be detected because the first sinusoidal signal is judged to be abnormal by the first signal abnormality judging unit. Also, in a case where a malfunction occurs in the second sensor, the malfunction of the second sensor can be detected because the second sinusoidal signal is judged to be abnormal by the second signal abnormality judging unit.

In a preferred embodiment of the present invention, the target phase difference is 90 degrees.

The above and yet other objects, features, and effects of the present invention shall be made clearer by the following description of the preferred embodiments with reference to the attached drawings.

BRIEF DESCRIPTION OF DRAWINGS

FIG. 1 is a schematic view of an arrangement of a rotation angle detection device according to a first preferred embodiment of the present invention.

FIG. 2 is a functional block diagram of a detailed arrangement of a rotation angle computing device.

FIG. 3 is an explanatory diagram for explaining a method by which a phase difference deviation computing unit computes a phase difference deviation.

FIG. 4 is a flowchart of a procedure of a rotation angle computing process performed by the rotation angle computing device.

FIG. 5 is a schematic view of an arrangement of a rotation angle detection device according to a second preferred embodiment of the present invention.

FIG. 6 is a flowchart of a procedure of a rotation angle computing process performed by a rotation angle computing device.

FIG. 7 is a schematic view of an arrangement of a rotation angle detection device according to a third preferred embodiment of the present invention.

FIG. 8 is a flowchart of an operation example of a first V1 abnormality monitoring unit.

FIG. 9 is a flowchart of an operation example of a first V2 abnormality monitoring unit.

[FIG. 10] FIG. 10 is a flowchart of an operation example of a second V1 abnormality monitoring unit.

[FIG. 11] FIG. 11 is a flowchart of an operation example of a second V2 abnormality monitoring unit.

[FIG. 12]

FIG. 13 is a schematic view for explaining a method of rotation angle detection by a conventional rotation angle detection device.

[FIG. 14]

[FIG. 15]

DESCRIPTION OF EMBODIMENTS

Preferred embodiments with which the present invention is applied to a rotation angle detection device for detecting a rotation angle of a rotor of a brushless motor shall now be described in detail with reference to the attached drawings.

Figure 1:
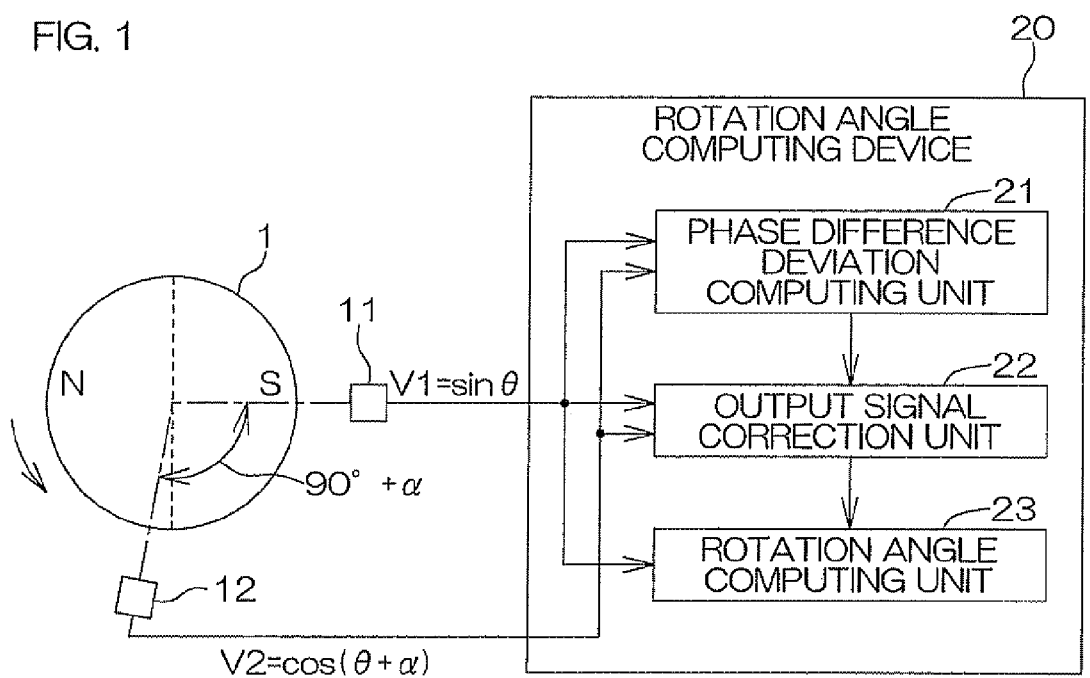
[FIG. 1]

FIG. 1 is a schematic view of an arrangement of a rotation angle detection device according to a first preferred embodiment of the present invention.

The rotation angle detection device may be used, for example, to detect a rotation angle of a rotor of a brushless motor for electric power steering. The rotation angle detection device has, for example, a detection rotor that rotates in accordance with rotation of the brushless motor. The rotor 1 includes a cylindrical magnet having a plurality of magnetic pole pairs. In the present example, the magnet has a single magnetic pole pair. That is, the magnet has two magnetic poles N and S disposed at equal intervals.

At a periphery of the rotor 1, a first magnetic sensor 11 and a second magnetic sensor 12 are respectively disposed at a first position and a second position that are separated by an interval in a circumferential direction of the rotor 1. As the magnetic sensors, for example, Hall elements, magnetoresistive elements (MR elements), or other elements having a characteristic of changing in electrical characteristic due to action of a magnetic field, may be used.

The two magnetic sensors 11 and 12 are preferably separated by an angular interval centered about a central rotation axis of the rotor 1 and corresponding to a predetermined phase difference that is set in advance (hereinafter, referred to as the "target phase difference"). In the present preferred embodiment, the target phase difference is set to 90°. However, in actuality, there are cases in which, due to manufacturing variation, etc., the angular interval between the two magnetic sensors 11 and 12 is not the angular interval corresponding to the target phase difference. With the present preferred embodiment, it shall be deemed that the actual angular interval between the two magnetic sensors 11 and 12 is not the 90° corresponding to the target phase difference but is (90°+α) due to manufacturing variation, etc. α is a phase difference deviation with respect to the target phase difference. The phase difference corresponding to the actual angular interval between the two magnetic sensors 11 and 12 ((90°+α) in the present example) shall be a positional phase difference. Each of the phase differences is an electrical angle.

A direction indicated by the arrow in FIG. 1 shall be deemed to be a positive rotation direction of the rotor 1. It shall also be deemed that the rotation angle of the rotor 1 increases when the rotor 1 is rotated in the positive direction, and the rotation angle of the rotor 1 decreases when the rotor 1 is rotated in the opposite direction. If $\theta$ is the rotation angle of the rotor 1, an output signal V1 of the first magnetic sensor 11 is expressed as $V1 = A1 \cdot \sin\theta$, and an output signal V2 of the second magnetic sensor 12 is expressed as $V2 = A2 \cdot \sin(\theta + 90° + \alpha) = A2 \cdot \cos(\theta + \alpha)$. A1 and A2 respectively express amplitudes.

If the amplitudes A1 and A2 are deemed to be mutually equal to a value A or both signals V1 and V2 are normalized so that both amplitudes are of a certain predefined value A, the two signals V1 and V2 are respectively expressed as $A \cdot \sin\theta$ and $A \cdot \cos(\theta + \alpha)$. Here, if $A=1$, the two signals V1 and V2 are respectively expressed as $\sin\theta$ and $\cos(\theta + \alpha)$. Thus, to simplify the description, the output signals V1 and V2 of the respective magnetic sensors 11 and 12 shall be expressed as $V1 = \sin\theta$ and $V2 = \cos(\theta + \alpha)$ in the following description.

The output signals V1 and V2 of the respective magnetic sensors 11 and 12 are input into a rotation angle computing device 20. The rotation angle computing device 20 computes the rotation angle $\theta$ of the rotor 1 based on the output signals V1 and V2 of the respective magnetic sensors 11 and 12. The rotation angle computing device 20 is arranged, for example, from a microcomputer and includes a CPU (central processing unit) and a memory (ROM, RAM, etc.). The rotation angle computing device 20 functions as a plurality of functional processing units by the CPU executing predetermined programs stored in the ROM. The plurality of functional processing units include a phase difference deviation computing unit (phase difference deviation computing means) 21, an output signal correction unit (signal correction means) 22, and a rotation angle computing unit (rotation angle computing means) 23.

The phase difference deviation computing unit 21 computes a phase difference deviation α based on the output signals V1 and V2 of the two magnetic sensors 11 and 12. The phase difference deviation computing unit 21 computes the phase difference deviation α in advance and stores it in the memory before drive control of the brushless motor is performed. For example, the phase difference deviation computing unit 21 computes the phase difference deviation α and stores it in the memory before a product in which the rotation angle detection device is installed is shipped. The phase difference deviation computing unit 21 may be arranged to recompute the phase difference deviation α and update the phase difference deviation α in the memory at every predetermined period or based on a predetermined command after the product in which the rotation angle detection device is installed has been shipped.

When drive control of the brushless motor 1 is being performed, the output signal correction unit 22 corrects the output signal V2 of the one magnetic sensor 12 based on the phase difference deviation α computed and stored in the memory by the phase difference deviation computing unit 21 to determine a signal V2' that is corrected for the phase difference deviation α. Here, the signal V2' corrected for the phase difference deviation α is a signal (cos θ) with which the phase difference with respect to the output signal V1 is equal to the target phase difference (90° in the present example).

The rotation angle computing unit 23 computes the rotation angle θ of the rotor 1 based on the signal V2' (=cos θ), corrected for the phase difference deviation α by the output signal correction unit 22, and the other output signal V1 (=sin θ).

Figure 2:
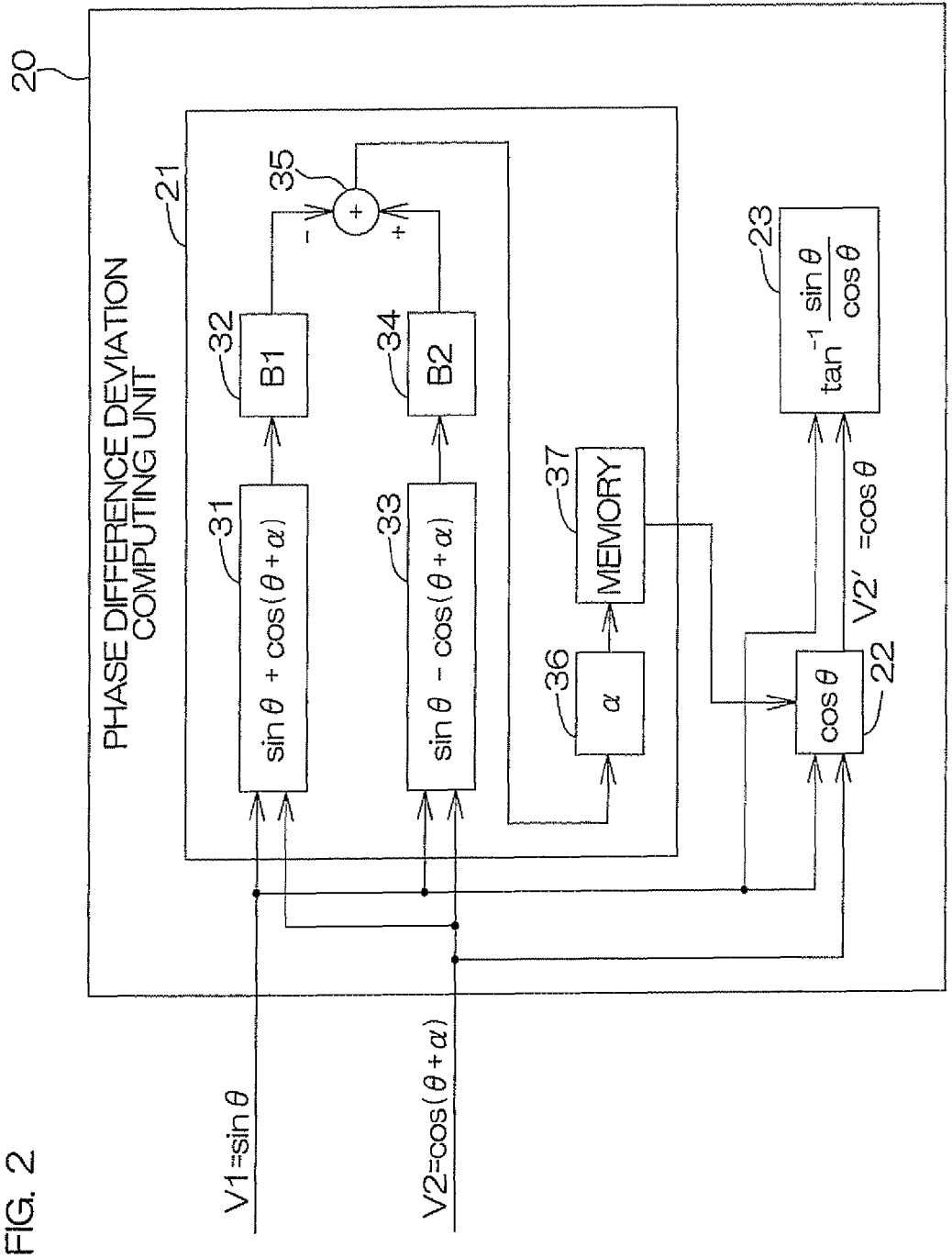
[FIG. 2]

FIG. 2 is a functional block diagram of a more detailed arrangement of the rotation angle computing device 20.

The phase difference deviation computing unit 21 includes a signal sum computing unit 31, a first amplitude computing unit 32, a signal difference computing unit 33, a second amplitude computing unit 34, an amplitude difference computing unit 35, a deviation computing unit 36, and a memory 37.

The signal sum computing unit 31 computes a sum of the output signals V1 and V2 of the two magnetic sensors 11 and 12. A signal corresponding to a sum of the output signals V1 and V2 (hereinafter, referred to as the "sum signal") is expressed by the following Formula (2).

$$V1 + V2 = \sin\theta + \cos(\theta + \alpha) \quad (2)$$
$$= 2 \cdot \sin\left(\theta + \frac{\pi}{4} + \frac{\alpha}{2}\right) \cdot \cos\left(\frac{\pi}{4} + \frac{\alpha}{2}\right)$$

Thus, an amplitude B1 of the sum signal is expressed by the following Formula (3).

$$B1 = 2 \cdot \cos\left(\frac{\pi}{4} + \frac{\alpha}{2}\right) \quad (3)$$

The first amplitude computing unit 32 determines the amplitude 31 of the sum signal based on the computation result of the signal sum computing unit 31. Specifically, for example, the signal sum computing unit 31 is made to compute signal sums (V1+V2) while the rotor 1 is made to rotate, and the signal sums respectively corresponding to a plurality of arbitrary rotation angles of the rotor 1 are thereby acquired. From the signal sums corresponding to the plurality of rotation angles thus acquired, maximal values and minimal values of the sum signal are extracted, and the amplitude B1 of the sum signal is determined based on the extracted maximal values and minimal values. For example, ½ of a value determined by subtracting an average of the extracted minimal values from an average of the extracted maximal values may be determined as the amplitude B1.

The signal difference computing unit 33 computes a difference (V1−V2) between the output signals V1 and V2 of the two magnetic sensors 11 and 12. A signal corresponding to the difference between the output signals V1 and V2 (hereinafter, referred to as the "difference signal") is expressed by the following Formula (4).

$$V1 + V2 = \sin\theta - \cos(\theta + \alpha) \quad (4)$$
$$= -2 \cdot \cos\left(\theta + \frac{\pi}{4} + \frac{\alpha}{2}\right) \cdot \sin\left(\frac{\pi}{4} + \frac{\alpha}{2}\right)$$

Thus, an amplitude B2 of the difference signal is expressed by the following Formula (5).

$$B2 = 2 \cdot \sin\left(\frac{\pi}{4} + \frac{\alpha}{2}\right) \quad (5)$$

The second amplitude computing unit 34 determines the amplitude B2 of the difference signal based on the computation result of the signal difference computing unit 33. Specifically, for example, the signal difference computing unit 33 is made to compute signal differences (V1−V2) while the rotor 1 is made to rotate, and the signal differences respectively corresponding to a plurality of arbitrary rotation angles of the rotor 1 are thereby acquired. Maximal values and minimal values of the difference signal are extracted from the signal differences corresponding to the plurality of rotation angles thus acquired, and the amplitude B2 of the difference signal is determined based on the extracted maximal values and minimal values. For example, ½ of a value determined by subtracting an average of the extracted minimal values from an average of the extracted maximal values may be determined as the amplitude B1.

The amplitude difference computing unit 35 computes a difference ΔB (=B2−B1) between the amplitude B1 computed by the first amplitude computing unit 32 and the amplitude B2 computed by the second amplitude computing unit 34. When computations are performed using the Formulae (3) and (5), the amplitude difference ΔB is expressed by the following Formula (6).

$$\Delta B = B2 - B1 \quad (6)$$
$$= 2 \cdot \sin\left(\frac{\pi}{4} + \frac{\alpha}{2}\right) - 2 \cdot \cos\left(\frac{\pi}{4} + \frac{\alpha}{2}\right)$$
$$= 2\sqrt{2} \cdot \sin\left(\frac{\alpha}{2}\right)$$

Figure 3:
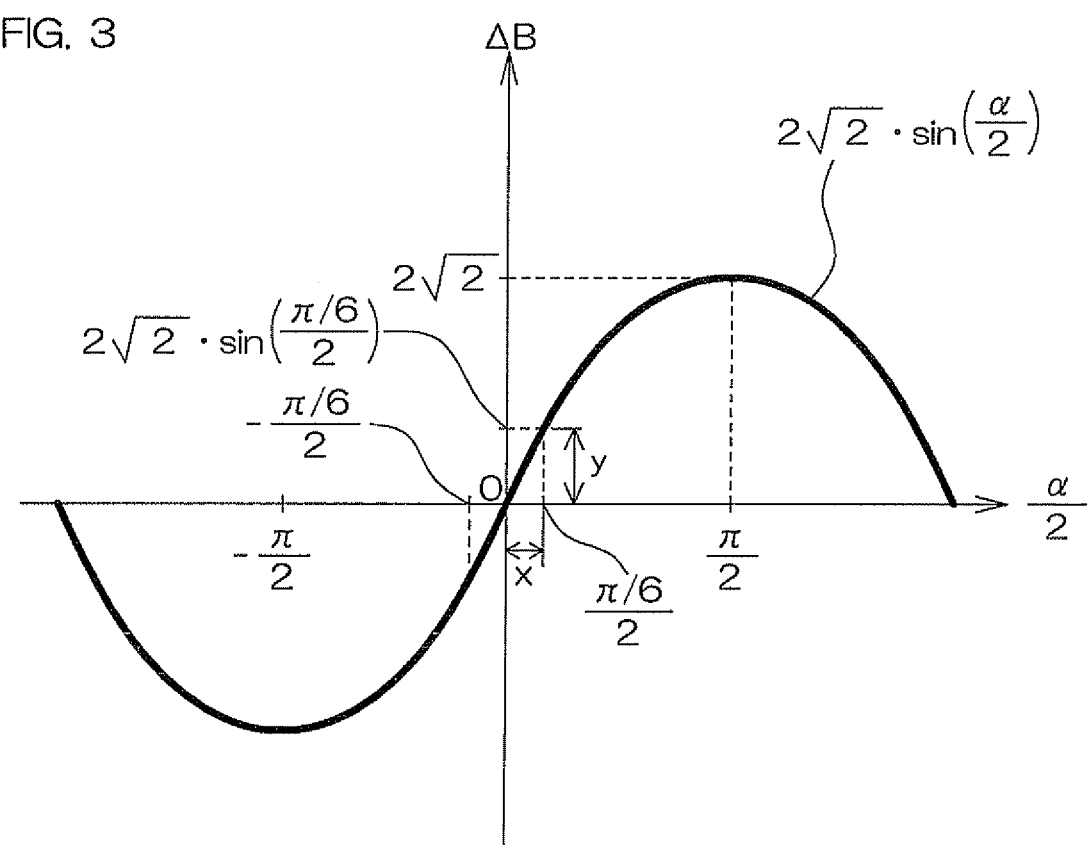
[FIG. 3]

The deviation computing unit 36 computes the phase difference deviation α based on the amplitude difference ΔB computed by the amplitude difference computing unit 35. As expressed by Formula (6), the amplitude difference ΔB is (2√2·sin(α/2)), which is a function of α. When expressed on a graph, the function is a sine curve, such as shown in FIG. 3. However, an x-axis of FIG. 3 is not α but is α/2. The function can be deemed to be a substantially straight line in a range in which an absolute value of α is small. In the present preferred embodiment, α/2 is deemed to be proportional to 2√2·sin(α/2) as indicated in the following Formula (7) when α is within a range of −π/6≤α≤π/6.

$$2\sqrt{2}\cdot\sin(\alpha/2) K\cdot\alpha/2 \quad (7)$$

In Formula (7), K is a proportionality constant. In a case where a portion of the sine curve shown in FIG. 3 within the range in which the value of the x-axis is −(π/6)/2 to (π/6)/2 is deemed to be a straight line, the proportionality constant K corresponds to being a slope y/x of the straight line. The proportionality constant K is thus expressed by the following Formula (8).

$$K = \frac{y}{x} = \frac{2\sqrt{2} \cdot \sin\left(\frac{\pi/6}{2}\right)}{\frac{\pi/6}{2}} \quad (8)$$

As shown in Formula (6), $\Delta B = 2\sqrt{2} \cdot \sin(\alpha/2)$ and thus by using Formulae (7) and (8), $\Delta B$ can be expressed approximately as shown in the following Formula (9).

$$\Delta B = \frac{2\sqrt{2} \cdot \sin\left(\frac{\pi/6}{2}\right)}{\frac{\pi/6}{2}} \cdot \frac{\alpha}{2} \quad (9)$$

By modifying Formula (9), the phase difference deviation $\alpha$ is expressed by the following Formula (10).

$$\alpha = \frac{\Delta B}{\frac{2\sqrt{2} \cdot \sin\left(\frac{\pi/6}{2}\right)}{\pi/6}} \quad (10)$$

The phase difference deviation computing unit uses the amplitude difference $\Delta B$ computed by the amplitude difference computing unit 35 to compute the phase difference deviation $\alpha$ based on Formula (10). The computed phase difference deviation $\alpha$ is stored in the memory 37.

The output signal correction unit 22 corrects the output signal V2 ($=\cos(\theta+\alpha)$) based on the following Formula (11) to obtain a signal V2' ($=\cos\theta$) corrected for the phase difference deviation $\alpha$. That is, the output signal correcting unit 22 determines the corrected signal V2' ($=\cos\theta$) from the output signal V1 ($=\sin\theta$), the output signal V2 ($=\cos(\theta+\alpha)$), $\sin\alpha$, and $\cos\alpha$. Formula (11) may be derived based on a formula obtained by expansion of $\cos(\theta+\alpha)$ based on a trigonometric function addition theorem.

$$\begin{aligned} V2' &= \cos\theta \\ &= \frac{\sin\alpha \cdot \sin\theta + \cos(\theta+\alpha)}{\cos\alpha} \\ &= \frac{\sin\alpha \cdot V1 + V2}{\cos\alpha} \end{aligned} \quad (11)$$

The rotation angle computing unit 23 uses the signal V2' ($=\cos\theta$) corrected for the phase difference deviation $\alpha$ and the other output signal V1 ($=\sin\theta$) to compute the rotation angle $\theta$ of the rotor 1 based, for example, on the following Formula (12).

$$\begin{aligned} \theta &= \tan^{-1}(\sin\theta/\cos\theta) \\ &= \tan^{-1}(V1/V2') \end{aligned} \quad (12)$$

The rotation angle computing unit 23 may be arranged to determine the rotation angle $\theta$ from the signal V2' ($=\cos\theta$) and the output signal V1 ($=\sin\theta$) using a method that differs from the method of using Formula (12). For example, the rotation angle $\theta$ may be determined from the signal V2' ($=\cos\theta$) and the output signal V1 ($=\sin\theta$) using a method disclosed in Japanese Published Unexamined Patent Application No. 2001-264114.

Figure 4:
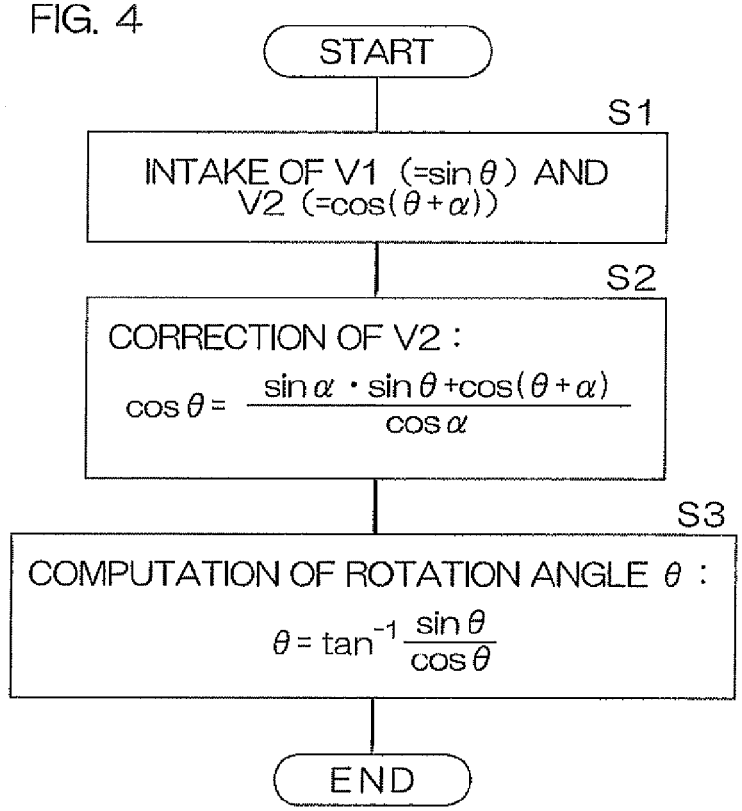
[FIG. 4]

FIG. 4 is a flowchart of a procedure of a rotation angle computing process executed by the rotation angle computing device 20. It shall be deemed that the phase difference deviation $\alpha$ has already been computed by the phase difference deviation computing unit 21 and is stored in the memory.

The rotation angle computing process is performed repeatedly at every predetermined computation cycle. First, the rotation angle computing device 20 takes in the output signals V1 ($=\sin\theta$) and V2 ($=\cos(\theta+\alpha)$) of the magnetic sensors 11 and 12 (step S1). The output signal correction unit 22 of the rotation angle computing device 20 then uses the output signals V1 and V2 taken in at step S1 and the phase difference deviation $\alpha$ stored in the memory to correct the second output signal V2 based on Formula (11) (step S2). The signal V2' ($=\cos\theta$) corrected for the phase difference deviation $\alpha$ is thereby obtained.

Next, the rotation angle computing unit 23 of the rotation angle computing device 20 uses the signal V2' ($=\cos\theta$) corrected for the phase difference deviation $\alpha$ and the output signal V1 ($=\sin\theta$) taken in at step S1 to compute the rotation angle $\theta$ of the rotor 1 based on Formula (12) (step S3).

By the first preferred embodiment described above, the rotation angle $\theta$ can be detected accurately even in a case where there is a variation in the angular interval between the two magnetic sensors 11 and 12 (relative positions of the two magnetic sensors 11 and 12).

Although in the first preferred embodiment, the output signal V2 of the second magnetic sensor 12 is corrected with the output signal V1 of the first magnetic sensor 11 being deemed to be $\sin\theta$ and the output signal V2 of the second magnetic sensor 12 being deemed to be $\cos(\theta+\alpha)$, arrangements may be made to correct the output signal V1 of the first magnetic sensor 11 with the output signal V2 of the second magnetic sensor 12 being deemed to be $\cos\theta$ and the output signal V1 of the first magnetic sensor 11 being deemed to be $\sin(\theta+\alpha)$ instead. Also, although it is deemed that $\alpha/2$ is proportional to $2\sqrt{2} \cdot \sin(\alpha/2)$ when $\alpha$ is within a range of $-\pi/6 \leq \alpha \leq \pi/6$, the range is not limited thereto and suffices to be a range in which linearity of $2\sqrt{2} \cdot \sin(\alpha/2)$ is substantially maintained.

Also, although in the first preferred embodiment, $\alpha$ is determined approximately by deeming that $\alpha/2$ is proportional to $2\sqrt{2} \cdot \sin(\alpha/2)$ in a range in which $\alpha$ is small, $\alpha$ may be determined as follows instead. That is, based on Formula (6), a table (map) of correspondence of $\alpha$ and the amplitude difference $\Delta B$ ($=2\sqrt{2} \cdot \sin(\alpha/2)$) is prepared in advance and stored, and $\alpha$ is determined by reading, from the table, the $\alpha$ corresponding to the amplitude difference $\Delta B$ determined by the amplitude difference computing unit 35 (see FIG. 2).

Further, although in the first preferred embodiment, each of the amplitude B1 of the sum signal and the amplitude B2 of the difference signal is determined as ½ the value determined by subtracting the average of the extracted minimal values from the average of the maximal values, in a case where a plurality of magnetic pole pairs are provided in the rotor 1, the phase difference deviation $\alpha$ may be computed for each magnetic pole pair by determining ½ the value determined by subtracting the minimal value from the maximal value for each magnetic pole pair.

Figure 5:
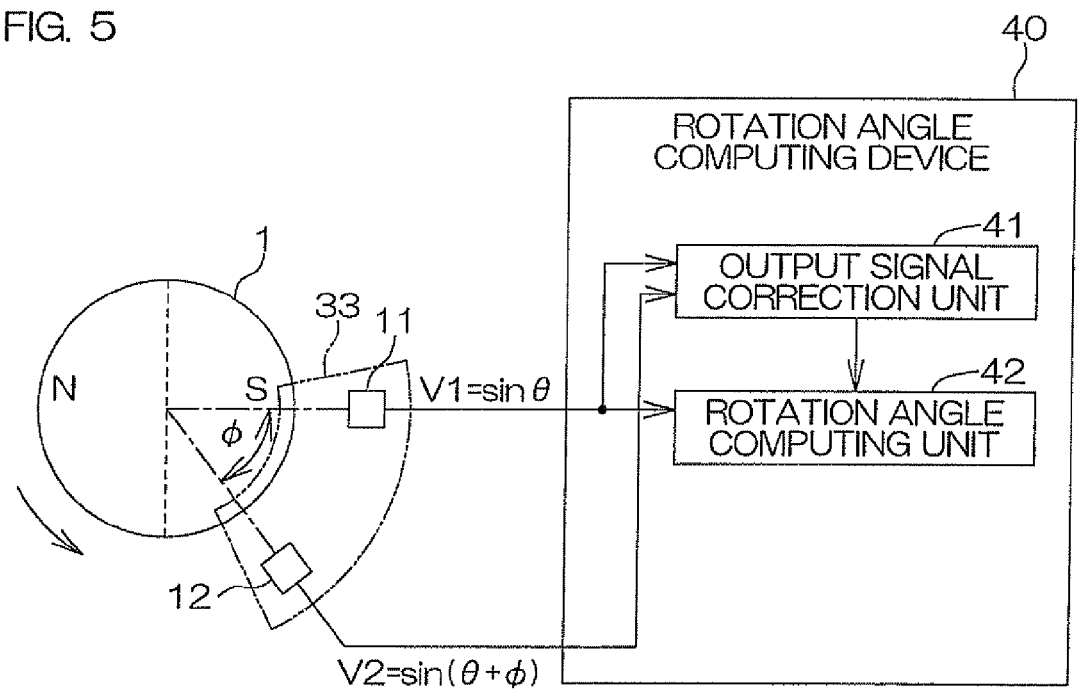
[FIG. 5]

FIG. 5 is a schematic view of an arrangement of a rotation angle detection device according to a second preferred embodiment of the present invention.

The rotor 1 includes a magnet having two magnetic poles N and S. At the periphery of the rotor 1, the first magnetic sensor 11 and the second magnetic sensor 12 are respectively disposed at the first position and the second position that are separated by a predetermined angular interval $\phi$ centered about the central rotation axis of the rotor 1. The angular interval ϕ may be set to any angle. In the present preferred embodiment, the angular interval ϕ between the two magnetic sensors 11 and 12 is set to an angular interval that is less than 90 degrees. The two magnetic sensors 11 and 12 are mounted on a board 33 indicated by dashed lines in FIG. 5.

As in the first preferred embodiment, it shall be deemed that the direction indicated by the arrow in FIG. 5 is the positive rotation direction of the rotor 1. Also, as in the first preferred embodiment, the output signals of the respective magnetic sensors 11 and 12 shall be expressed in simple form in which the amplitudes thereof are deemed to be 1. That is, with θ being the rotation angle of the rotor 1, the output signal V1 of the first magnetic sensor 11 shall be expressed as V1=sin θ, and the output signal V2 of the second magnetic sensor 12 shall be expressed as V2=sin(θ+ϕ). The phase difference (positional phase difference) of the two output signals V1 and V2 is thus ϕ. The positional phase difference is an electrical angle.

The output signals V1 and V2 of the respective magnetic sensors 11 and 12 are input into a rotation angle computing device 40. The rotation angle computing device 40 computes the rotation angle θ of the rotor 1 based on the output signals V1 and V2 of the respective magnetic sensors 11 and 12. The rotation angle computing device 40 is arranged, for example, from a microcomputer and includes a CPU (central processing unit) and a memory (ROM, RAM, etc.). The rotation angle computing device 40 functions as a plurality of functional processing units by the CPU executing predetermined programs stored in the ROM. The plurality of functional processing units include an output signal correction unit (signal correction means) and a rotation angle computing unit (rotation angle computing means) 42. The angular interval 9 between the two magnetic sensors 11 and 12, that is, the positional phase difference ϕ between the two output signals V1 and V2 is stored in the memory. Instead of storing the positional phase difference ϕ in the memory, a value of sin ϕ and a value of cos ϕ may be stored in the memory.

The output signal correction unit 41 corrects the output signal V2 based on the output signals V1 and v2 of the two magnetic sensors 11 and 12. Specifically, the output signal correction unit 41 corrects the output signal V2 to a signal with which the phase difference with respect to the output signal V1 is equal to a predetermined target phase difference. The target phase difference is an electrical angle. In the present preferred embodiment, the target phase difference is set to 90°. The output signal correction unit 41 thus corrects the output signal V2 to a signal V2' (=sin(θ+90°)=cos θ) with which the phase difference with respect to the output signal V1 is 90°.

The output signal V2 (=sin(θ+ϕ)) can be expanded as shown in the following Formula (13) based on a trigonometric function addition theorem.

$$V2=\sin(\theta+\phi)=\sin\phi\cdot\cos\phi+\cos\phi\cdot\sin\phi \quad (13)$$

By modifying Formula (13), Formula (14) for correcting the signal V2 to the signal V2' is obtained.

$$\begin{aligned}V2' &= \cos\theta \\ &= \frac{\sin(\theta+\phi)-\sin\theta\cdot\cos\phi}{\sin\phi} \\ &= \frac{V2-V1\cdot\cos\phi}{\sin\phi}\end{aligned} \quad (14)$$

The output signal correction unit 41 corrects the output signal V2 to the signal V2' (=cos θ) with which the phase difference with respect to the output signal V1 is 90° based on Formula (14). That is, the output signal correction unit 41 corrects the signal V2 based on the output signal V1 (=sin θ), the output signal V2 (=sin(θ+ϕ)), and the positional phase difference ϕ stored in the memory. In a case where the value of sin ϕ and the value of cos ϕ are stored in the memory, the output signal V2 is corrected using the values of sin ϕ and cos ϕ in place of the positional phase difference ϕ.

The rotation angle computing unit 42 uses the signal. V2' (=cos θ) corrected by the output signal correction unit 41 and the other output signal V1 (=sin θ) to compute the rotation angle θ of the rotor 1 based, for example, on the following Formula (15).

$$\theta=\tan^{-1}(\sin\theta/\cos\theta)=\tan^{-1}(V1/V2') \quad (15)$$

The rotation angle computing unit 42 may be arranged to determine the rotation angle θ from the signal V2' (=cos θ) and the output signal V1 (=sin θ) using a method that differs from the method of using Formula (15). For example, the rotation angle θ may be determined from the signal V2' (=cos θ) and the output signal V1 (=sin θ) using a method disclosed in Japanese Published Unexamined Patent Application No. 2001-264114.

Figure 6:
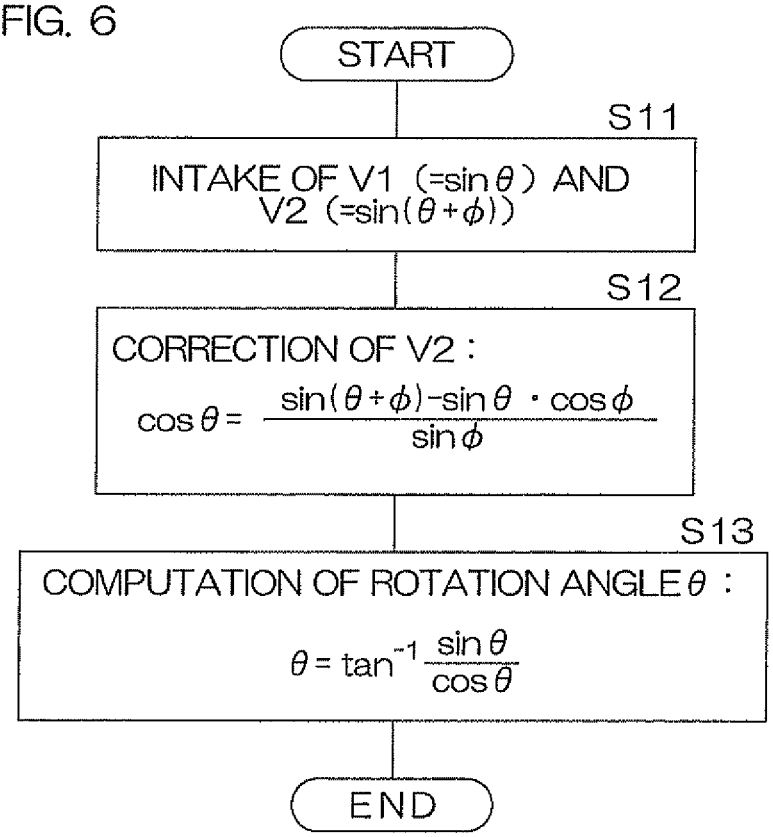
[FIG. 6]

FIG. 6 is a flowchart of a procedure of a rotation angle computing process executed by the rotation angle computing device 40. It shall be deemed that the value of the "positional phase difference ϕ" or the values of "sin ϕ and cos ϕ" is or are stored in the memory.

The rotation angle computing process is performed repeatedly at every predetermined computation cycle. First, the rotation angle computing device 40 takes in the output signals V1 (=sin θ) and V2 (=sin(θ+ϕ)) of the magnetic sensors 11 and 12 (step S11). The output signal correction unit 41 of the rotation angle computing device 40 then uses the output signals V1 and V2 taken in at step S11 and the value of the "positional phase difference ϕ" or the values of "sin ϕ and cos ϕ" that is or are stored in the memory to correct the second output signal V2 based on Formula (14) (step S12). The corrected signal V2' (=cos θ) with which the phase difference with respect to the output signal V1 is 90° is thereby obtained.

Next, the rotation angle computing unit 42 of the rotation angle computing device 40 uses the signal V2' (=cos θ) obtained by the output signal correction unit 41 and the output signal V1 (=sin θ) taken in at step S11 to compute the rotation angle θ of the rotor 1 based on Formula (15) (step S13).

By the second preferred embodiment described above, regardless of the positional phase difference between the output signals V1 and V2 of the two magnetic sensors 11 and 12, one output signal among the signals can be corrected so that the phase difference between the signals is made equal to the target phase difference (for example, 90°) that is suited for computing the rotation angle θ of the rotor 1. It thus becomes possible to compute the rotation angle θ of the rotor 1 regardless of the positional phase difference between the output signals V1 and V2 of the two magnetic sensors 11 and 12, and thus it becomes possible to set the angular interval between the two magnetic sensors 11 and 12 (the relative positions of the two sensors 11 and 12) arbitrarily.

Figure 13:
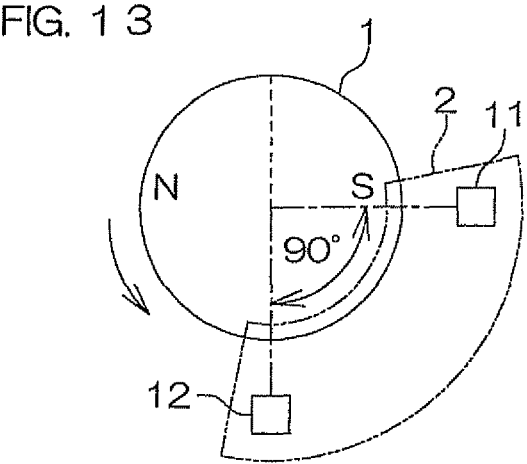
[FIG. 13]
Figure 14A:
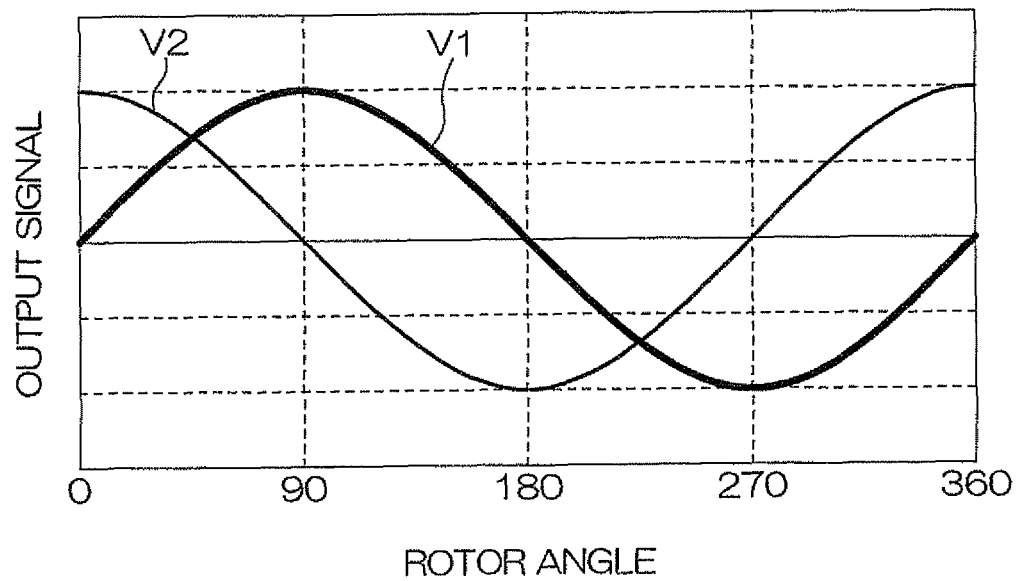
FIG. 14A is a schematic view of respective output signals of two sensors in a case where an angular interval between the two sensors is 90°.
Figure 14B:
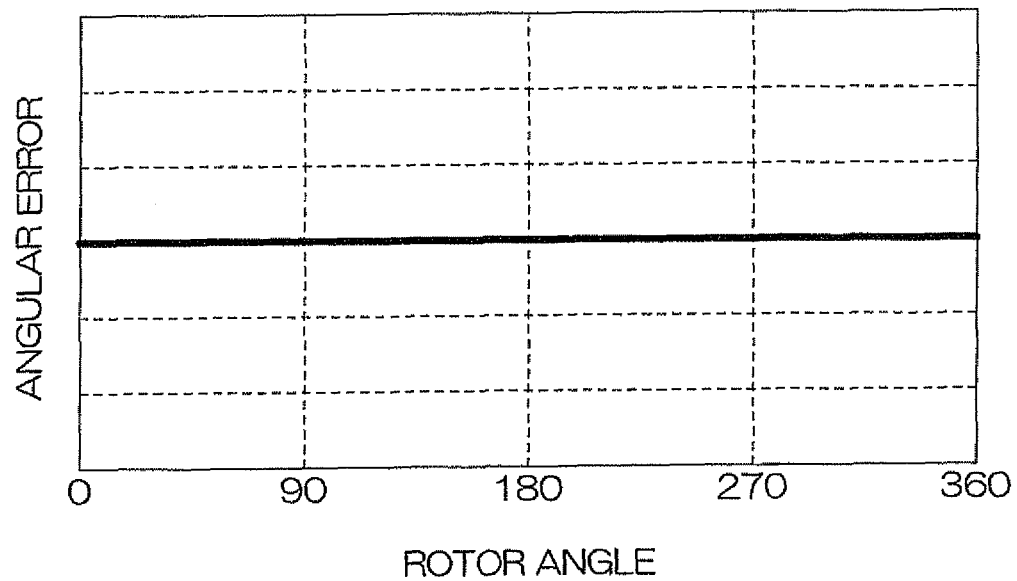
FIG. 14B is a schematic view of an angular error of a rotation angle detected by the conventional rotation angle detection device.
Figure 15A:
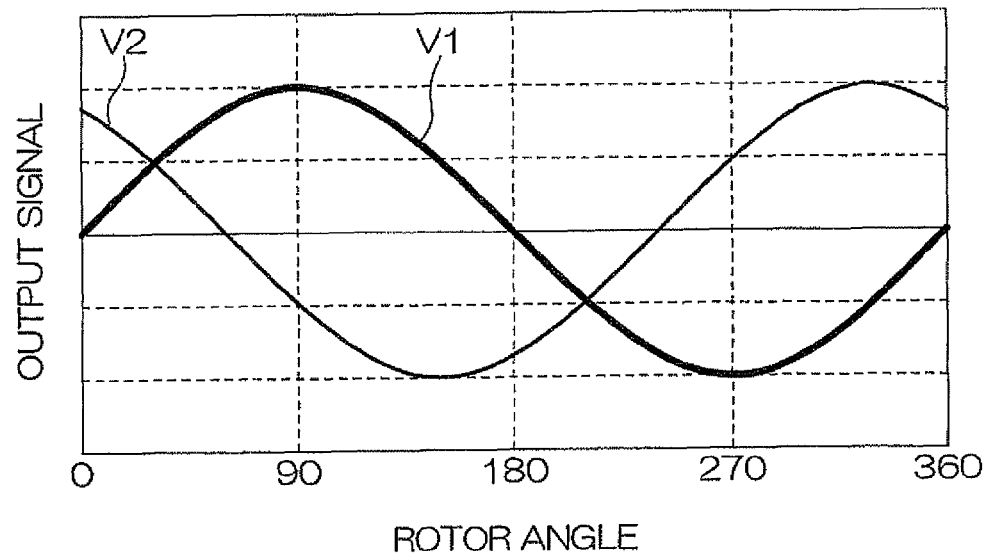
FIG. 15A is a schematic view of respective output signals of two sensors in a case where an angular interval between the two sensors deviates from 90°.
Figure 15B:
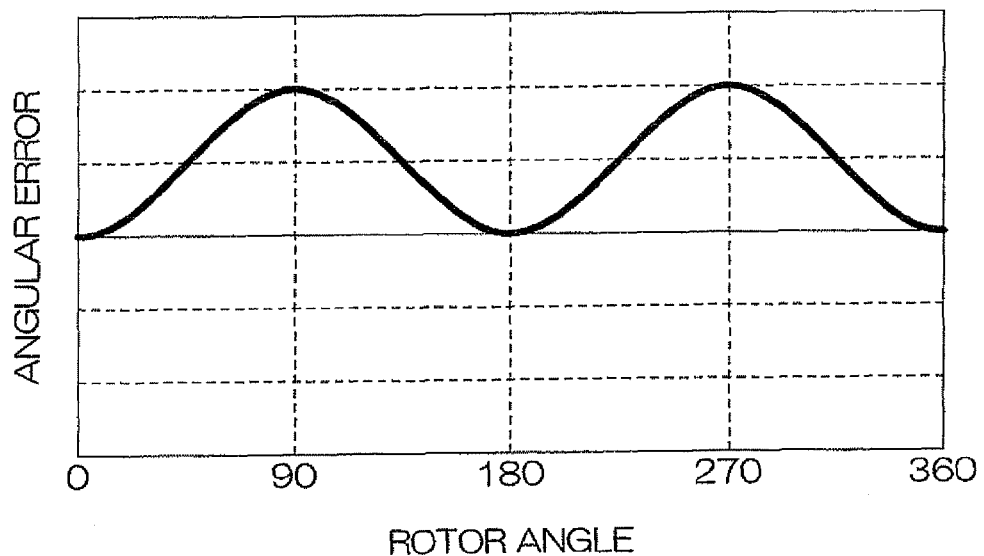
FIG. 15B is a schematic view of an angular error of a rotation angle detected by the conventional rotation angle detection device.

The angular interval (positional phase difference) between the two magnetic sensors 11 and 12 can thereby be set, for example, as shown in FIG. 5, to an angle less than the target phase difference of 90°. In a case where the angular interval between the two magnetic sensors 11 and 12 is set to an angle less than 90° as shown in FIG. 5, the board 2 or 33 for mounting the magnetic sensors 11 and 12 can be made smaller in comparison to the case where the angular interval between the two magnetic sensors 11 and 12 is set to 90° as shown in FIG. 13.

In the second preferred embodiment, the denominator at the right-hand side of Formula (14) for correcting (converting) the output signal V2 to the signal V2' (=cos θ), with which the phase difference with respect to the output signal V1 is 90°, is sin φ. Thus, when the value of sin φ is small, the denominator at the right-hand side of Formula (14) becomes small and thus an error that arises when V2 is corrected to V2' becomes large. Thus, in determining the angular interval φ between the two sensors 11 and 12, it is preferable to avoid a range of φ in which the value of sin φ is comparatively small. Specifically, sin φ takes a comparatively small value when φ is in any one of the ranges of 0 to 4 degrees, 176 to 184 degrees, and 356 to 360 degrees. It is thus preferable to set the angular interval φ between the two sensors 11 and 12 within a range of 5 to 175 degrees or 185 to 355 degrees.

As in the first preferred embodiment, the rotation angle θ may be computed in consideration of the positional variation α of the two magnetic sensors 11 and in the second preferred embodiment as well. As an example, it shall be assumed that the angular interval between the two magnetic sensors 11 and 12 in FIG. 5 is (θ+α) due to there being a variation (phase difference deviation) α in the positions of the two magnetic sensors 11 and 12, that is, it shall be assumed that a phase difference deviation is superimposed on the positional phase difference.

If the output signal V1 of the first magnetic sensor 11 is sin θ and the output signal V2 of the second magnetic sensor 12 is sin(θ+φ+α), a sum signal corresponding to a sum of the two signals V1 and V2 is expressed by the following Formula (16).

$$V1 + V2 = \sin\theta + \sin(\theta + \phi + \alpha) \quad (16)$$
$$= 2 \cdot \sin\left(\theta + \frac{\phi + \alpha}{2}\right) \cdot \cos\left(\frac{\phi + \alpha}{2}\right)$$

An amplitude C1 of the sum signal is thus expressed by the following Formula (17).

$$C1 = 2 \cdot \cos\left(\frac{\phi + \alpha}{2}\right) \quad (17)$$

Meanwhile, a difference signal corresponding to a difference (V1−V2) between the two signals V1 and V2 is expressed by the following Formula (18).

$$V1 - V2 = \sin\theta - \sin(\theta + \phi + \alpha) \quad (18)$$
$$= -2 \cdot \cos\left(\theta + \frac{\phi + \alpha}{2}\right) \cdot \sin\left(\frac{\phi + \alpha}{2}\right)$$

An amplitude C2 of the difference signal is thus expressed by the following Formula (19).

$$C2 = 2 \cdot \sin\left(\frac{\phi + \alpha}{2}\right) \quad (19)$$

A difference ΔC of the two amplitudes is expressed by the following Formula (20).

$$\Delta C = C2 - C1 \quad (20)$$
$$= 2 \cdot \sin\left(\frac{\phi + \alpha}{2}\right) - 2 \cdot \cos\left(\frac{\phi + \alpha}{2}\right)$$
$$= 2\sqrt{2} \cdot \sin\left(\frac{\phi - 90°}{2} + \frac{\alpha}{2}\right)$$

The amplitude difference ΔC is thus a function of α having φ as a parameter (intervening variable). A table (map) of correspondence of the amplitude difference ΔC in accordance with φ and α is thus prepared in advance. Then, as in the first preferred embodiment, the amplitude difference ΔC is computed and the α corresponding to the obtained amplitude difference ΔC is determined as the phase difference deviation α. In a case where ((φ−90°)/2) at the right-hand side of Formula (20) is close to 0, the phase difference deviation α may be determined upon deeming that in a predetermined range in which α is small, the amplitude difference ΔC is proportional to α/2 as described with the first preferred embodiment.

Meanwhile, when sin(θ+φ+α) is expanded based on the trigonometric function addition theorem, the following Formula (21) is obtained.

$$\sin(\theta+\phi+\alpha)=\sin\theta\cdot\cos(\phi+\alpha)+\cos\theta\cdot\sin(\phi+\alpha) \quad (21)$$

By modifying Formula (21), the following Formula (22) is obtained.

$$\cos\theta = \frac{\sin(\theta + \phi + \alpha) - \sin\theta \cdot \cos(\phi + \alpha)}{\sin(\phi + \alpha)} \quad (22)$$
$$= \frac{V2 - V1 \cdot \cos(\phi + \alpha)}{\sin(\phi + \alpha)}$$

φ, α, the output signal V1 (=sin θ) and the output signal V2 (=sin(θ+φ+α)) are thus used to compute cos θ based on Formula (22). The rotation angle θ is then computed from cos θ thus obtained and the output signal V1 (=sin θ).

Figure 7:
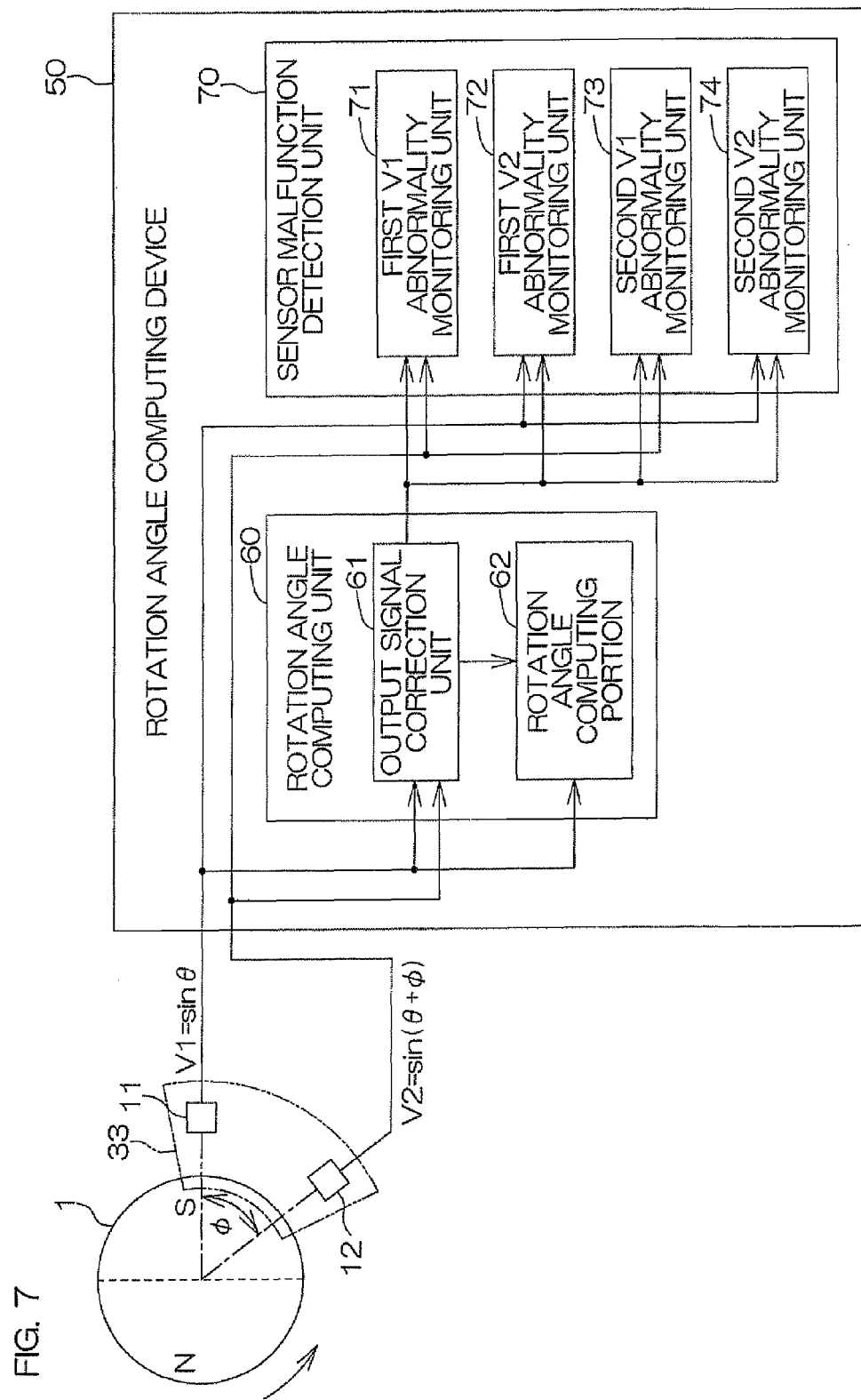
[FIG. 7]

FIG. 7 is a schematic view of an arrangement of a rotation angle detection device according to a third preferred embodiment of the present invention.

The rotor 1 includes a magnet having two magnetic poles N and S. At the periphery of the rotor 1, the first magnetic sensor 11 and the second magnetic sensor 12 are respectively disposed at the first position and the second position that are separated by the predetermined angular interval φ centered about the central rotation axis of the rotor 1. The angular interval φ may be set to any angle. In the present preferred embodiment, the angular interval φ between the two magnetic sensors 11 and 12 is set to an angular interval that is less than 90 degrees. The two magnetic sensors 11 and 12 are mounted on the board 33 indicated by dashed lines in FIG. 7.

It shall be deemed that the direction indicated by the arrow in FIG. 7 is the positive rotation direction of the rotor 1. Also, as in the first preferred embodiment, the output signals of the respective magnetic sensors 11 and 12 shall be expressed in simple form in which the amplitudes thereof are deemed to be 1. That is, with θ being the rotation angle of the rotor 1, the output signal V1 of the first magnetic sensor 11 shall be expressed as V1=sin θ, and the output signal V2 of the second magnetic sensor 12 shall be expressed as V2=sin(θ+φ). The phase difference (positional phase difference) of the two output signals V1 and V2 is φ. The positional phase difference is an electrical angle.

The output signals V1 and V2 of the respective magnetic sensors 11 and 12 are input into a rotation angle computing device 50. The rotation angle computing device 50 is arranged, for example, from a microcomputer and includes a CPU (central processing unit) and a memory (ROM, RAM, etc.). The rotation angle computing device 50 functions as a plurality of functional processing units by the CPU executing predetermined programs stored in the ROM. The plurality of functional processing units include a rotation angle computing unit 60 and a sensor malfunction detection unit 70. The angular interval φ of the two magnetic sensors 11 and 12, that is, the positional phase difference φ between the two output signals V1 and V2 is stored in the memory. Instead of storing the positional phase difference φ in the memory, a value of sin φ and a value of cos φ may be stored in the memory.

The rotation angle computing unit 60 computes the rotation angle θ of the rotor 1 at every predetermined first computation cycle. That is, the rotation angle computing unit 60 takes in the output signals V1 and V2 of the respective magnetic sensors 11 and 12 at every first computation cycle and computes the rotation angle θ of the rotor 1 based on output signals V1 and V2 that have been taken in. The rotation angle computing unit 60 includes an output signal correction unit (signal correction means) 61 and a rotation angle computing portion (rotation angle computing means) 62.

The output signal correction unit 61 corrects the output signal V2 based on the output signals V1 and V2 of the two magnetic sensors 11 and 12. Specifically, the output signal correction unit 61 corrects the output signal V2 to a signal with which the phase difference with respect to the output signal V1 is made equal to a predetermined target phase difference. The target phase difference is an electrical angle. In the present preferred embodiment, the target phase difference is set to 90°. The output signal correction unit 61 thus corrects the output signal V2 to a signal V2' (=sin(θ+90°)=cos θ) with which the phase difference with respect to the output signal V1 is 90°.

The output signal V2 (=sin(θ+φ)) can be expanded as shown in the following Formula (23) based on the trigonometric function addition theorem.

$$V2 = \sin(\theta+\phi) = \sin\theta \cdot \cos\phi + \cos\theta \cdot \sin\phi \quad (23)$$

By modifying Formula (23), Formula (24) for correcting the signal V2 to the signal V2' is obtained.

$$V2' = \cos\theta \quad (24)$$
$$= \frac{\sin(\theta+\phi) - \sin\theta \cdot \cos\phi}{\sin\phi}$$
$$= \frac{V2 - V1 \cdot \cos\phi}{\sin\phi}$$

The output signal correction unit 61 corrects the output signal V2 to the signal V2' (=cos θ) with which the phase difference with respect to the output signal V1 is 90° based on Formula (24). That is, the output signal correction unit 61 corrects the signal V2 based on the output signal V1 (=sin θ), the output signal V2 (=sin(θ+φ)), and the positional phase difference φ stored in the memory. In the case where the value of sin φ and the value of cos φ are stored in the memory, the output signal V2 is corrected using the values of sin φ and cos φ in place of the positional phase difference φ.

The rotation angle computing portion 62 uses the signal V2' (=cos θ) corrected by the output signal correction unit 61 and the other output signal V1 (=sin θ) to compute the rotation angle θ of the rotor 1 based, for example, on the following Formula (25).

$$\theta = \tan^{-1}(\sin\theta/\cos\theta) = \tan^{-1}(V1/V2') \quad (25)$$

The rotation angle computing portion 62 may be arranged to determine the rotation angle θ from the signal V2' (=cos θ) and the output signal V1 (=sin θ) using a method that differs from the method of using Formula (25). For example, the rotation angle θ may be determined from the signal V2' (=cos θ) and the output signal V1 (=sin θ) using a method disclosed in Japanese Published Unexamined Patent Application No. 2001-264114.

The sensor malfunction detection unit 70 detects a malfunction of the magnetic sensors 11 and 12 based on the output signals V1 and V2 of the respective magnetic sensors 11 and 12. When the magnetic sensor 11 or 12 malfunctions, its output signal V1 or V2 becomes fixed at zero, an upper limit value, or a lower limit value. The output signals V1 and V2 of the respective magnetic sensors 11 and 12 are thus monitored and when either output signal is detected to be fixed at zero, the upper limit value, or the lower limit value (when the output signal is judged to be abnormal), it can be judged that a malfunction has occurred in the corresponding magnetic sensor.

The sensor malfunction detection unit 70 includes a first V1 abnormality monitoring unit 71, a first V2 abnormality monitoring unit 72, a second V1 abnormality monitoring unit 73, and a second V2 abnormality monitoring unit 74. The first V1 abnormality monitoring unit 71 performs a process of judging whether or not the output signal V1 of the first magnetic sensor 11 is fixed at zero based on the output signal V2 of the second magnetic sensor 12 and the signal V2' computed by the output signal correction unit 61 inside the rotation angle computing unit 60. The first V2 abnormality monitoring unit 72 performs a process of judging whether or not the output signal V2 of the second magnetic sensor 12 is fixed at zero based on the output signal V1 of the first magnetic sensor 11 and the signal V2' computed by the output signal correction unit 61.

The second V1 abnormality monitoring unit 73 performs a process of judging whether or not the output signal V1 of the first magnetic sensor 11 is fixed at the upper limit value (+1) or the lower limit value (−1) based on the output signal V2 of the second magnetic sensor 12 and the signal V2' computed by the output signal correction unit 61. The second V2 abnormality monitoring unit 74 performs a process of judging whether or not the output signal V2 of the second magnetic sensor 12 is fixed at the upper limit value (+1) or the lower limit value (−1) based on the output signal V1 of the first magnetic sensor 11 and the signal V2' computed by the output signal correction unit 61.

The sensor malfunction detection unit 70 takes in the output signal V1 of the first magnetic sensor 11 and the output signal V2 of the second magnetic sensor 12 at every predetermined second computation cycle, provides the output signal V1 taken in to the first V2 abnormality monitoring unit 72 and the second V2 abnormality monitoring unit 74, and provides the output signal V2 taken in to the first V1 abnormality monitoring unit 71 and the second V1 abnormality monitoring unit 73. In the present preferred embodiment, the second computation cycle is set to a cycle that is equal to or longer than a cycle (first computation cycle) in which the rotation angle computing unit 60 computes the rotation angle.

Figure 8:
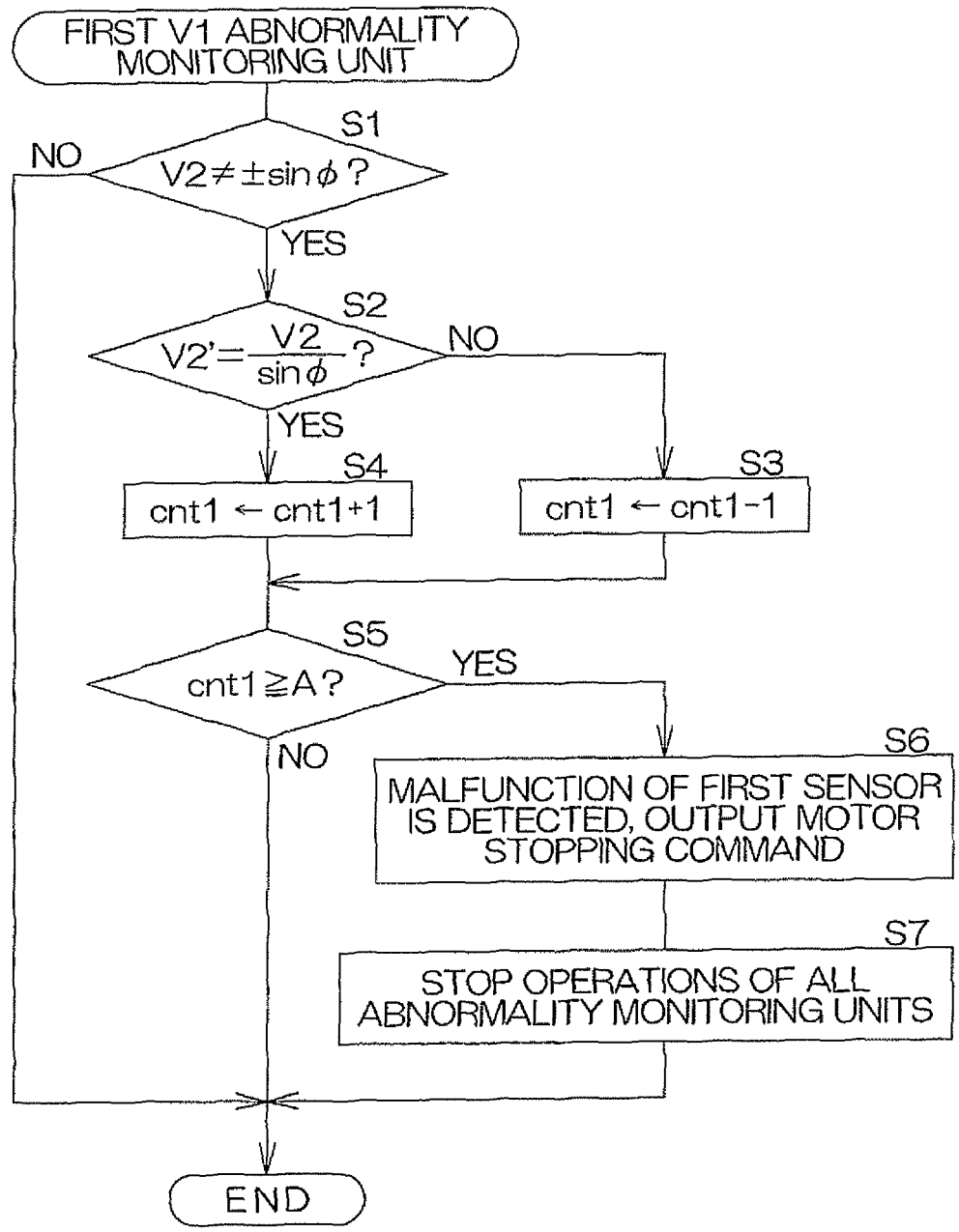
[FIG. 8]

FIG. 8 is a flowchart of an operation example of the first V1 abnormality monitoring unit 71. The process of FIG. 8 is executed at every second computation cycle.

The process of FIG. 8 is performed to judge whether or not the output signal V1 (=sin θ) of the first magnetic sensor 11 is fixed at zero. If the output signal V1 of the first magnetic sensor 11 is fixed at zero, the signal V2' (the signal corresponding to cos θ) computed by the output signal correction unit 61 is V2'=V2/sin φ by substitution of V1=0 in Formula (24). It is thus judged at every predetermined period of time (second computation cycle) whether or not the signal V2' computed by the output signal correction unit 61 is equal to the computed value (V2/sin φ), and if the state of V2'=V2/sin φ continues for no less than a predetermined number of times, it can be judged that a malfunction has occurred in the first magnetic sensor 11.

However, even when the first magnetic sensor 11 is normal, if the rotation angle θ is, for example, 0° or 180°, the output signal V1 (=sin θ) will be 0. Thus, the judging of whether or not the signal V2' is equal to the computed value (V2/sin φ) is not performed at a rotation angle θ at which the output signal V1 is zero when the first magnetic sensor 11 is normal.

Returning to FIG. 8, the first V1 abnormality monitoring unit 71 judges whether or not the output signal V2 of the second magnetic sensor 12 that has been taken in at the present computation cycle is not equal to either of the values sin φ and −sin φ (step S1). If the output signal V2 of the second magnetic sensor 12 is equal to the value of sin φ or −sin φ (step S1: NO), the first V1 abnormality monitoring unit 71 ends the process in the present computation cycle.

Figure 12A:
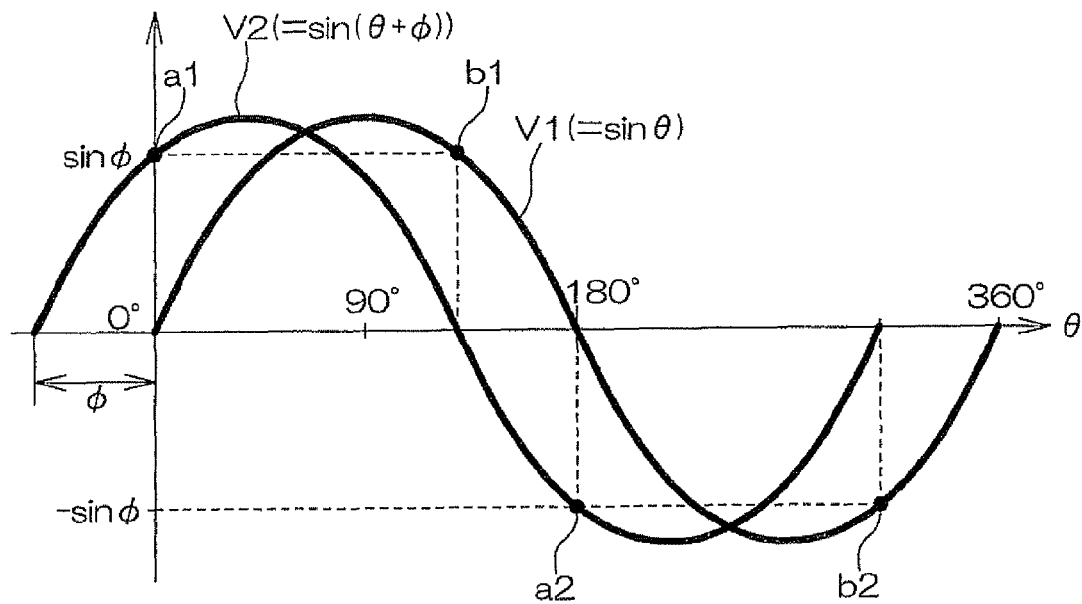
FIG. 12A is an explanatory diagram for explaining operations of the first V1 abnormality monitoring unit and the first V2 abnormality monitoring unit.

FIG. 12A indicates waveforms of the output signals V1 and V2 when the first magnetic sensor 11 and the second magnetic sensor 12 are normal. Along the sinusoidal curve expressing the waveform of the output signal V2, the points corresponding to the rotation angle θ for which the output signal V1 (=sin θ) is 0 are a point a1 and a point a2. The value of the output signal V2 corresponding to the point a1 is sin φ. Meanwhile, the value of the output signal V2 corresponding to the point a2 is sin(180°+φ)=−sin φ. Thus, when the output signal V2 is equal to sin φ or −sin φ, the judging of whether or not the signal V2', corresponding to cos θ, is equal to the computed value (V2/sin φ) is not performed.

If in step S1, it is judged that the output signal V2 of the second magnetic sensor 12 is not equal to either of the values of sin φ and −sin φ (step S1: YES), the first V1 abnormality monitoring unit 71 computes V2/sin φ and judges whether or not the signal V2' provided from the output signal correction unit 61 is equal to the computed value (V2/sin φ) (step S2). The signal V2' provided from the output signal correction unit 61 is the signal V2' computed from the signals V1 and V2 that are the same as the output signals V1 and V2 taken in by the sensor malfunction detection unit 70 in the present second computation cycle.

If the signal V2' is not equal to the computed value (V2/sin φ) (step S2: NO), the first V1 abnormality monitoring unit 71 decrements a first count value cnt1 by just 1 (−1) (step S3). Step S5 is then entered. A default value of the first count value cnt1 is zero. Also, the first count value cnt1 is an integer no less than zero and does not take a negative value. Thus, even if the first count value cnt1 is decremented by just 1 in step S3, the first count value cnt1 will not be a value less than zero.

If in step S2, it is judged that the signal V2' is equal to the computed value (V2/sin φ) (step S2: YES), the first V1 abnormality monitoring unit 71 increments the first count value cnt1 by just 1 (+1) (step S4). Step S5 is then entered.

In step S5, the first V1 abnormality monitoring unit 71 judges whether or not the first count value cnt1 is no less than a predetermined threshold value A. If the first count value cnt1 is less than the threshold value A (step S5: NO), the first V1 abnormality monitoring unit 71 ends the process in the present computation cycle. On the other hand, if the first count value cnt1 is judged to be no less than the threshold value A (step S5: YES), the first V1 abnormality monitoring unit 71 detects that a malfunction has occurred in the first magnetic sensor 11 and outputs a motor stopping command to a motor control device of the unillustrated brushless motor (step S6). Also, the first V1 abnormality monitoring unit 71 stops operations of all abnormality monitoring units 71 to 74 (step S7). Upon receiving the motor stopping command from the first V1 abnormality monitoring unit 71, the motor control device stops drive of the brushless motor.

Figure 9:
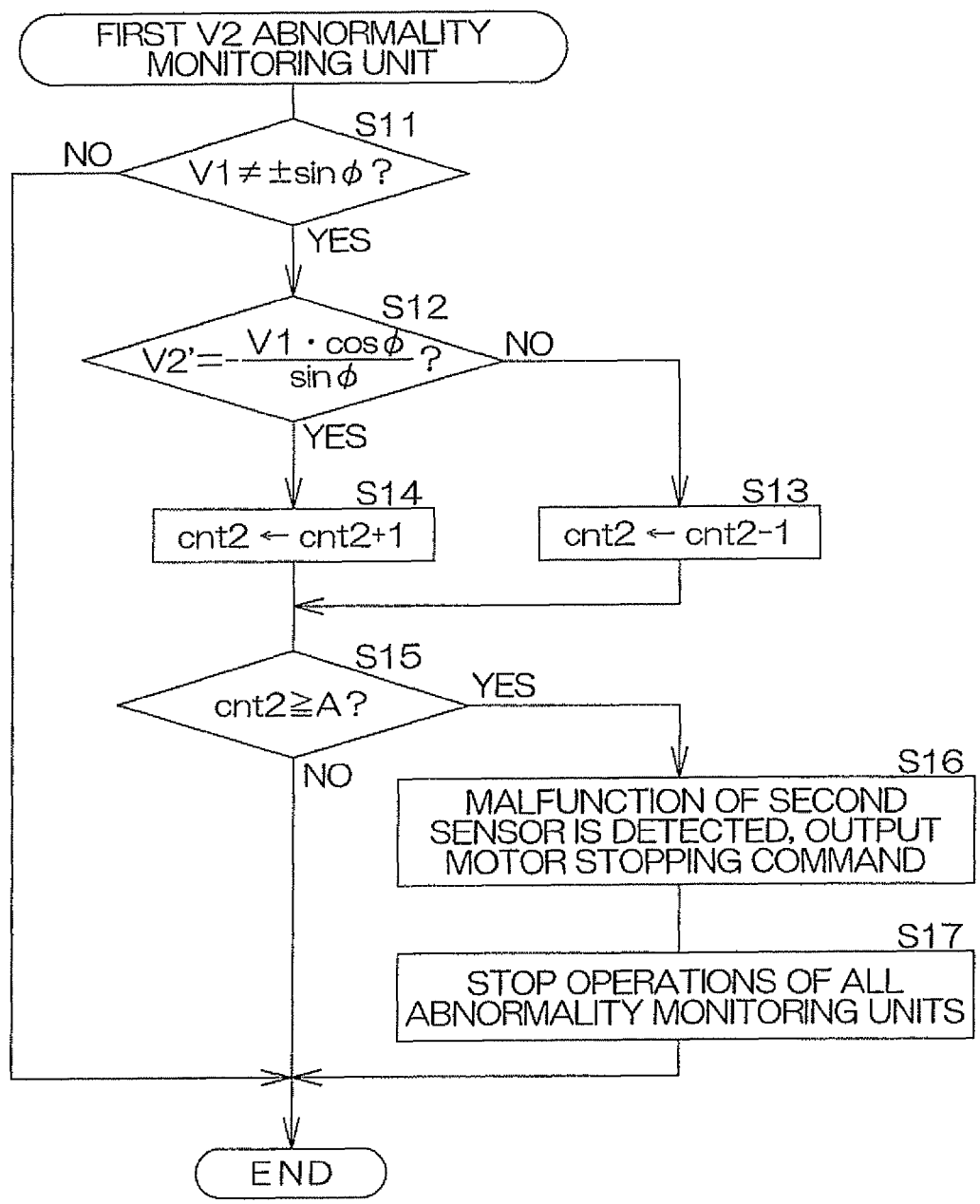
[FIG. 9]

FIG. 9 is a flowchart of an operation example of the first V2 abnormality monitoring unit 72. The process of FIG. 9 is executed at every second computation cycle.

The process of FIG. 9 is performed to judge whether or not the output signal V2 (=sin(θ+φ)) of the second magnetic sensor 12 is fixed at zero. If the output signal V2 of the second magnetic sensor 12 is fixed at zero, the signal V2' (the signal corresponding to cos θ) computed by the output signal correction unit 61 is V2'=−V1·cos φ/sin φ by substitution of V2=0 in Formula (24). It is thus judged at every predetermined period of time (second computation cycle) whether or not the signal V2' is equal to the computed value (−V1·cos φ/sin φ), and if the state of V2'=−V1·cos φ/sin φ continues for no less than a predetermined number of times, it can be judged that a malfunction has occurred in the second magnetic sensor 12.

However, even when the second magnetic sensor 12 is normal, if the rotation angle θ is, for example, (180°−φ) or (360°−φ), the output signal V2 (=sin(θ+φ)) will be 0 as shown in FIG. 12A. Thus, the judging of whether or not the signal V2' is equal to the computed value (−V1·cos φ/sin φ) is not performed at a rotation angle θ at which the output signal V2 is zero when the second magnetic sensor 12 is normal.

Returning to FIG. 9, the first V2 abnormality monitoring unit 72 judges whether or not the output signal V1 of the first magnetic sensor 11 that has been taken in at the present computation cycle is not equal to either of the values of sin φ and −sin φ (step S11). If the output signal V1 of the first magnetic sensor 11 is equal to the value of sin φ or −sin φ (step S11: NO), the first V2 abnormality monitoring unit 72 ends the process in the present computation cycle.

Referring to FIG. 12A, along the sinusoidal curve expressing the waveform of the output signal V1, the points corresponding to the rotation angle θ for which the output signal V2 (=sin(θ+φ)) is 0 are a point b1 and a point b2. The value of the output signal V1 corresponding to the point b1 is sin(180°−φ)=sin φ. Meanwhile, the value of the output signal V1 corresponding to the point b2 is sin(360°−φ)=−sin φ. Thus, when the output signal V1 is equal to sin φ or −sin φ, the judging of whether or not the signal V2', corresponding to cos θ, is equal to the computed value (−V1·cos φ/sin φ) is not performed.

If in step S11, it is judged that the output signal V1 of the first magnetic sensor 11 is not equal to either of the values of sin φ and −sin φ (step S11: YES), the first V2 abnormality monitoring unit 72 computes −V1·cos φ/sin φ and judges whether or not the signal V2' provided from the output signal correction unit 61 is equal to the computed value (−V1·cos φ/sin φ) (step S12). The signal V2' provided from the output signal correction unit 61 is the signal V2' computed from the signals V1 and V2 that are the same as the output signals V1 and V2 taken in by the sensor malfunction detection unit 70 in the present second computation cycle.

If the signal V2' is not equal to the computed value $(-V1 \cdot \cos \phi / \sin \phi)$ (step S12: NO), the first V2 abnormality monitoring unit 72 decrements a second count value cnt2 by just 1 (−1) (step S13). Step S15 is then entered. A default value of the second count value cnt2 is zero. Also, the second count value cnt2 is an integer no less than zero and does not take a negative value. Thus, even if the second count value cnt2 is decremented by just 1 in step S13, the second count value cnt2 will not be a value less than zero.

If in step S12, it is judged that the signal V2' is equal to the computed value $(-V1 \cdot \cos \phi / \sin \phi)$ (step S12: YES), the first V2 abnormality monitoring unit 72 increments the second count value cnt2 by just 1 (+1) (step S14). Step S15 is then entered.

In step S15, the first V2 abnormality monitoring unit 72 judges whether or not the second count value cnt2 is no less than the predetermined threshold value A. If the second count value cnt2 is less than the threshold value A (step S15: NO), the first V2 abnormality monitoring unit 72 ends the process in the present computation cycle. On the other hand, if the second count value cnt2 is judged to be no less than the threshold value A (step S15: YES), the first V2 abnormality monitoring unit 72 detects that a malfunction has occurred in the second magnetic sensor 12 and outputs a motor stopping command to the motor control device of the unillustrated brushless motor (step S16). Also, the first V2 abnormality monitoring unit 72 stops operations of all abnormality monitoring units 71 to 74 (step S17). Upon receiving the motor stopping command from the first V2 abnormality monitoring unit 72, the motor control device stops drive of the brushless motor.

FIG. 10 is a flowchart of an operation example of the second V1 abnormality monitoring unit 73. The process of FIG. 10 is executed at every second computation cycle.

The process of FIG. 10 is performed to judge whether or not the output signal V1 $(=\sin \theta)$ of the first magnetic sensor 11 is fixed at 1 (upper limit value) or −1 (lower limit value). If the output signal V1 of the first magnetic sensor 11 is fixed at 1, the signal V2' (the signal corresponding to $\cos \theta$) computed by the output signal correction unit 61 is V2'=(V2−cos $\phi$)/sin $\phi$ by substitution of V1=1 in Formula (24). Also, if the output signal V1 of the first magnetic sensor 11 is fixed at −1, the signal V2' (the signal corresponding to $\cos \theta$) computed by the output signal correction unit 61 is V2'=(V2+cos $\phi$)/sin $\phi$ by substitution of V1=−1 in Formula (24). It is thus judged at every predetermined period of time (second computation cycle) whether or not the signal V2' is equal to the computed value {(V2−cos $\phi$)/sin $\phi$} or {(V2+cos $\phi$)/sin $\phi$}, and if the state of V2'=(V2−cos $\phi$)/sin $\phi$ or V2'=(V2+cos $\phi$)/sin $\phi$ continues for no less than a predetermined number of times, it can be judged that a malfunction has occurred in the first magnetic sensor 11.

However, even when the first magnetic sensor 11 is normal, if the rotation angle $\theta$ is, for example, 90°, the output signal V1 $(=\sin \theta)$ will be 1, or if the rotation angle $\theta$ is, for example, 270°, the output signal V1 $(=\sin \theta)$ will be −1 Thus, the judging of whether or not the signal V2' is equal to the computed value {(V2−cos $\phi$)/sin $\phi$} or {(V2+cos $\phi$)/sin $\phi$} is not performed at a rotation angle $\theta$ at which the output signal V1 is 1 or −1 when the first magnetic sensor 11 is normal.

Returning to FIG. 10, the second V1 abnormality monitoring unit 73 judges whether or not the output signal V2 of the second magnetic sensor 12 that has been taken in at the present computation cycle is equal to neither of the values of sin(90°+$\phi$) nor −sin(90°+$\phi$) (step S21). If the output signal V2 of the second magnetic sensor 12 is equal to the value of sin(90°+$\phi$) or −sin(90°+$\phi$) (step S21: NO), the second V1 abnormality monitoring unit 73 ends the process in the present computation cycle.

Figure 12B:
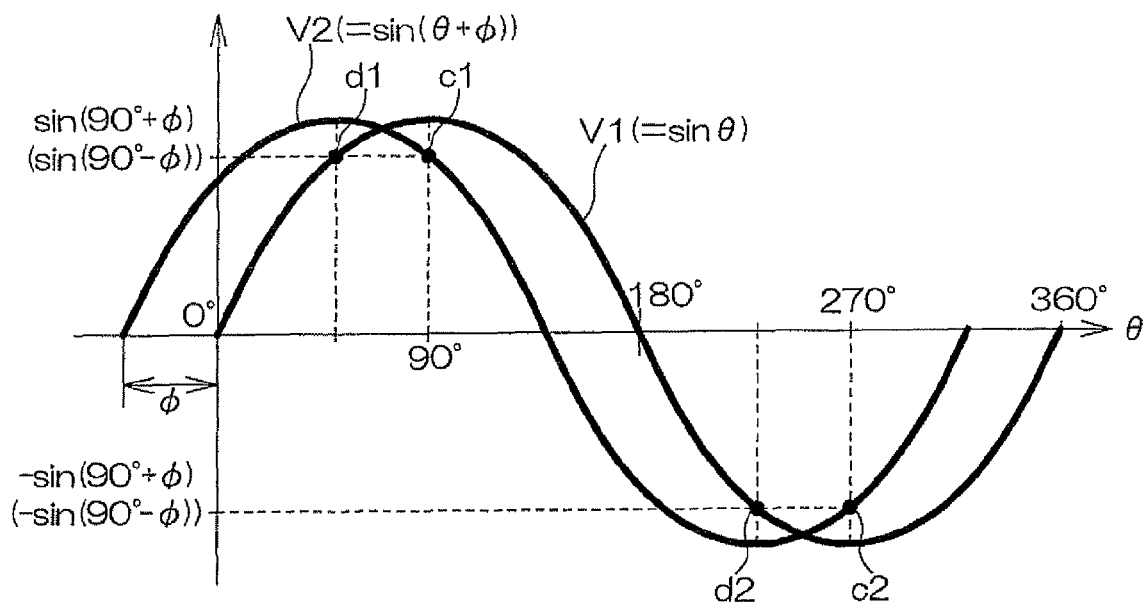
FIG. 12B is an explanatory diagram for explaining operations of the second V1 abnormality monitoring unit and the second V2 abnormality monitoring unit.

FIG. 12B indicates waveforms of the output signals V1 and V2 when the first magnetic sensor 11 and the second magnetic sensor 12 are normal. Along the sinusoidal curve expressing the waveform of the output signal V2, the points corresponding to the rotation angle $\theta$ for which the output signal V1 $(=\sin \theta)$ is 1 or −1 are a point c1 and a point c2. The value of the output signal V2 corresponding to the point c1 is sin(90°+$\phi$). Meanwhile, the value of the output signal V2 corresponding to the point c2 is sin(270°+$\phi$)=−sin(90°+$\phi$). Thus, when the output signal V2 is equal to sin(90°+$\phi$) or sin(90°+$\phi$), the judging of whether or not the signal V2', corresponding to cos $\theta$, is equal to the computed value {(V2−cos $\phi$)/sin $\phi$} or {(V2+cos $\phi$)/sin $\phi$} is not performed.

If in step S21, it is judged that the output signal V2 of the second magnetic sensor 12 is equal to neither of the values of sin(90°+$\phi$) nor −sin(90°+$\phi$) (step S21: YES), the second V1 abnormality monitoring unit 73 computes (V2−cos $\phi$)/sin $\phi$ and (V2+cos $\phi$)/sin $\phi$ and judges whether or not the signal V2' provided from the output signal correction unit 61 is equal to the computed value {(V2−cos $\phi$)/sin $\phi$} or {(V2+cos $\phi$)/sin $\phi$} (step S22). The signal V2' provided from the output signal correction unit 61 is the signal V2' computed from the signals V1 and V2 that are the same as the output signals V1 and V2 taken in by the sensor malfunction detection unit 70 in the present second computation cycle.

If the signal V2' is equal to neither of the computed values {(V2−cos $\phi$)/sin $\phi$} nor {(V2+cos $\phi$)/sin $\phi$} (step S22: NO), the second V1 abnormality monitoring unit decrements a third count value cnt3 by just 1 (−1) (step S23). Step S25 is then entered. A default value of the third count value cnt3 is zero. Also, the third count value cnt3 is an integer no less than zero and does not take a negative value. Thus, even if the third count value cnt3 is decremented by just 1 in step S23, the third count value cnt3 will not be a value less than zero.

If in step S22, it is judged that the signal V2' is equal to the computed value {(V2−cos $\phi$)/sin $\phi$} or {(V2+cos $\phi$)/sin $\phi$} (step S22: YES), the second V1 abnormality monitoring unit 73 increments the third count value cnt3 by just 1 (+1) (step S24). Step S25 is then entered.

In step S25, the second V1 abnormality monitoring unit 73 judges whether or not the third count value cnt3 is no less than the predetermined threshold value A. If the third count value cnt3 is less than the threshold value A (step S25: NO), the second V1 abnormality monitoring unit 73 ends the process in the present computation cycle. On the other hand, if the third count value cnt3 is judged to be no less than the threshold value A (step S25: YES), the second V1 abnormality monitoring unit 73 detects that a malfunction has occurred in the first magnetic sensor 11 and outputs the motor stopping command to the motor control device of the unillustrated brushless motor (step S26). Also, the second V1 abnormality monitoring unit 73 stops operations of all abnormality monitoring units 71 to 74 (step S27). Upon receiving the motor stopping command from the second V1 abnormality monitoring unit 73, the motor control device stops drive of the brushless motor.

FIG. 11 is a flowchart of an operation example of the second V2 abnormality monitoring unit 74. The process of FIG. 11 is executed at every second computation cycle.

The process of FIG. 11 is performed to judge whether or not the output signal V2 $(=\sin (\theta+\phi))$ of the second magnetic sensor 12 is fixed at 1 (upper limit value) or −1 (lower limit value). If the output signal V2 of the second magnetic sensor 12 is fixed at 1, the signal V2' (the signal corresponding to cos θ) computed by the output signal correction unit 61 is V2'=−(V1·cos φ−1)/sin φ by substitution of V2=1 in Formula (24). Also, if the output signal V2 of the second magnetic sensor 12 is fixed at −1, the signal V2' (the signal corresponding to cos θ) computed by the output signal correction unit 61 is V2'=−(V1·cos φ+1)/sin φ by substitution of V2=−1 in Formula (24). It is thus judged at every predetermined period of time (second computation cycle) whether or not the signal V2' is equal to the computed value {−(V1·cos φ−1)/sin φ} or {−(V1·cos φ+1)/sin φ}, and if the state of V2'=(V1·cos φ−1)/sin φ or V2'=−(V1·cos φ+1)/sin φ continues for no less than a predetermined number of times, it can be judged that a malfunction has occurred in the second magnetic sensor 12.

However, even when the second magnetic sensor 12 is normal, if the rotation angle θ is, for example, (90°−φ), the output signal V2 (=sin(θ+φ)) will be 1, and if the rotation angle θ is, for example, (270°−φ), the output signal V2 (=sin(θ+φ)) will be −1 as shown in FIG. 12B. Thus, the judging of whether or not the signal V2' is equal to the computed value {−(V1·cos φ−1)/sin φ} or {−(V1·cos φ+1)/sin φ} is not performed at a rotation angle θ at which the output signal V2 is 1 or −1 when the second magnetic sensor 12 is normal.

Returning to FIG. 11, the second V2 abnormality monitoring unit 74 judges whether or not the output signal V1 of the first magnetic sensor 11 that has been taken in at the present computation cycle is equal to neither of the values of sin(90−φ) nor −sin(90−φ) (step S31). If the output signal V1 of the first magnetic sensor 11 is equal to the value of sin(90−φ) or −sin(90−φ) (step S31: NO), the second V2 abnormality monitoring unit 74 ends the process in the present computation cycle.

Referring to FIG. 12B, along the sinusoidal curve expressing the waveform of the output signal V1, the points corresponding to the rotation angle θ for which the output signal V2 (=sin(θ+φ)) is 1 or −1 are a point d1 and a point d2. The value of the output signal V1 corresponding to the point d1 is sin(90°−φ). Meanwhile, the value of the output signal V1 corresponding to the point d2 is sin(270°−φ)=−sin(90°−φ). Thus, when the output signal V1 is equal to sin(90−φ) or −sin(90−φ), the judging of whether or not the signal V2', corresponding to cos θ, is equal to the computed value {−(V1·cos φ−1)/sin φ} or {−(V1·cos φ+1)/sin φ} is not performed.

If in step S31, it is judged that the output signal V1 of the first magnetic sensor 11 is equal to neither of the values of sin(90−φ) nor −sin(90−φ) (step S31: YES), the second V2 abnormality monitoring unit 74 computes {−(V1·cos φ−1)/sin φ} and {−(V1·cos p+1)/sin φ} and judges whether or not the signal V2' provided from the output signal correction unit 61 is equal to either of the computed value {−(V1·cos φ−1)/sin φ} or {−(V1·cos p+1)/sin φ} (step S32). The signal V2' provided from the output signal correction unit 61 is the signal V2' computed from the signals V1 and V2 that are the same as the output signals V1 and V2 taken in by the sensor malfunction detection unit 70 in the present second computation cycle.

If the signal V2' is equal to neither of the computed values {−(V1·cos φ−1)/sin φ} nor {−(V1·cos φ+1)/sin φ} (step S32: NO), the second V2 abnormality monitoring unit 74 decrements a fourth count value cnt4 by just 1 (−1) (step S33). Step S35 is then entered. A default value of the fourth count value cnt4 is zero. Also, the fourth count value cnt4 is an integer no less than zero and does not take a negative value. Thus, even if the fourth count value cnt4 is decremented by just 1 in step S33, the fourth count value cnt4 will not be a value less than zero.

If in step S32, it is judged that the signal V2' is equal to the computed value {−(V1·cos φ−1)/sin φ} or (−(V1·cos φ+1)/sin φ (step S32: YES), the second V2 abnormality monitoring unit 74 increments the fourth count value cnt4 by just 1 (+1) (step S34). Step S35 is then entered.

In step S35, the second V2 abnormality monitoring unit 74 judges whether or not the fourth count value cnt4 is no less than the predetermined threshold value A. If the fourth count value cnt4 is less than the threshold value A (step S35: NO), the second V2 abnormality monitoring unit 74 ends the process in the present computation cycle. On the other hand, if the fourth count value cnt4 is judged to be no less than the threshold value A (step S35: YES), the second V2 abnormality monitoring unit 74 detects that a malfunction has occurred in the second magnetic sensor 12 and outputs a motor stopping command to the motor control device of the unillustrated brushless motor (step S36). Also, the second V2 abnormality monitoring unit 74 stops operations of all abnormality monitoring units 71 to 74 (step S37). Upon receiving the motor stopping command from the second V2 abnormality monitoring unit 74, the motor control device stops drive of the brushless motor.

In the third preferred embodiment, when a malfunction occurs in either the first magnetic sensor 11 or the second magnetic sensor 12, this can be detected. Also, which of the magnetic sensors has malfunctioned can be specified.

Although preferred embodiments in cases of applying the present invention to a device for detecting the rotation angle of a rotor of a brushless motor was described above, the present invention may also be applied to a device for detecting the rotation angle of a rotating body besides a rotor of a brushless motor.

Although in the respective preferred embodiments, the magnet of the detection rotor 1 has a single pair of magnetic poles, the magnet of the detection rotor 1 may have a plurality of pairs of magnetic poles instead.

While preferred embodiments of the present invention have been described in detail above, these are merely specific examples for clarifying the technical contents of the present invention, the present invention should not be interpreted as being limited to the specific examples, and the scope of the present invention is to be limited solely by the attached claims.

The present application corresponds to Japanese Patent Application No. 2009-195188 filed in the Japan Patent Office on Aug. 26, 2009 and Japanese Patent Application No. 2010-94061 filed in the Japan Patent Office on Apr. 15, 2010, and the entire disclosures of the applications are incorporated herein by reference.

REFERENCE SIGNS LIST

1 Rotor
11, 12 Magnetic sensor

The invention claimed is:
1. A rotation angle detection device detecting a rotation angle of a rotating body and comprising:
a first sensor disposed at a first position at a periphery of the rotating body and outputting a first sinusoidal signal in accordance with a rotation of the rotating body;
a second sensor disposed at a second position at the periphery of the rotating body and at an angular interval from the first position and outputting a second sinusoidal signal, having a positional phase difference corresponding to the angular interval from the first sinusoidal signal, in accordance with the rotation of the rotating body; and a rotation angle computing device computing the rotation angle based on the first sinusoidal signal and the second sinusoidal signal, wherein the rotation angle computing device comprises:

a signal correction unit correcting one sinusoidal signal of the first sinusoidal signal and the second sinusoidal signal so that the positional phase difference that is a phase difference between the signals is made equal to a target phase difference;

a rotation angle computing unit computing the rotation angle based on the one sinusoidal signal corrected by the signal correction unit and the other sinusoidal signal;

a first signal abnormality judging unit judging whether or not the first sinusoidal signal is abnormal based on the one sinusoidal signal corrected by the signal correcting unit and the second sinusoidal signal; and a second signal abnormality judging unit judging whether or not the second sinusoidal signal is abnormal based on the one sinusoidal signal corrected by the signal correcting unit and the first sinusoidal signal.

2. The rotation angle detection device according to claim 1, wherein the target phase difference differs from the positional phase difference.

3. The rotation angle detection device according to claim 2, wherein the positional phase difference is less than the target phase difference.

4. The rotation angle detection device according to claim 1, wherein the target phase difference is 90 degrees.

5. The rotation angle detection device according to claim 1, wherein the first signal abnormality judging unit comprises:

a first abnormality monitoring unit performing a process of judging whether or not the first sinusoidal signal is fixed at zero; and a second abnormality monitoring unit performing a process of judging whether or not the first sinusoidal signal is fixed at an upper voltage limit value or a lower voltage limit value, and wherein the second signal abnormality judging unit comprises:

a third abnormality monitoring unit performing a process of judging whether or not the second sinusoidal signal is fixed at zero; and a fourth abnormality monitoring unit performing a process of judging whether or not the second sinusoidal signal is fixed at an upper voltage limit value or a lower voltage limit value.

6. The rotation angle detection device according to claim 5, wherein the target phase difference is 90 degrees.

7. The rotation angle detection device according to claim 6, wherein the first sensor outputs the first sinusoidal signal V1 expressed as $V1=\sin\theta$ with respect to a rotation angle $\theta$ of the rotating body, the second sensor outputs, with respect to the rotation angle $\theta$ of the rotating body, the second sinusoidal signal V2 expressed as $V2=\sin(\theta+\phi)$ using a phase difference $\phi$ between the first and second sinusoidal signals, and the signal correction unit corrects the second sinusoidal signal to a third sinusoidal signal V2' by the formula $V2'=(V2-V1\cdot\cos\phi)/\sin\phi$.

8. The rotation angle detection device according to claim 7, wherein the first abnormality monitoring unit judges that the first sinusoidal signal V1 is abnormality if the state where the third sinusoidal signal V2' computed by the signal correction unit is equal to the computed value $(V2/\sin\phi)$ continues for no less than a predetermined computing number of times, except when the second output signal V2 is equal to either of the values $\sin\phi$ or $-\sin\phi$, the second abnormality monitoring unit judges that the first sinusoidal signal V1 is abnormal if the state where the third sinusoidal signal V2' computed by the signal correction unit is equal to the computed value $\{(V2+\cos\phi)/\sin\phi\}$ or $\{(V2-\cos\phi)/\sin\phi\}$ continues for no less than a predetermined computing number of times, except when the second output signal V2 is equal to either of the values $\sin(90+\phi)$ or $-\sin(90+\phi)$, the third abnormality monitoring unit judges that the second sinusoidal signal V2 is abnormal if the state where the third sinusoidal signal V2' computed by the signal correction unit is equal to the computed value $(-V1\cdot\cos\phi/\sin\phi)$ continues for no less than a predetermined computing number of times, except when the first output signal V1 is equal to either of the values $\sin\phi$ or $-\sin\phi$, and the fourth abnormality monitoring unit judges that the second sinusoidal signal V2 is abnormal if the state where the third sinusoidal signal V2' computed by the signal correction unit is equal to the computed value $\{-(V1\cdot\cos\phi-1)/\sin\phi\}$ or $\{-(V1\cdot\cos\phi+1)/\sin\phi\}$ continues for no less than a predetermined computing number of times, except when the first output signal V1 is equal to either of the values $\sin(90-\phi)$ or $-\sin(90-\phi)$.

\* \* \* \* \*